United States Patent [19]

Milkovich et al.

[11] 4,085,168

[45] Apr. 18, 1978

[54] CHEMICALLY JOINED, PHASE SEPARATED SELF-CURED HYDROPHILIC THERMOPLASTIC GRAFT COPOLYMERS AND THEIR PREPARATION

[75] Inventors: Ralph Milkovich, Naperville; Mutong T. Chiang, Palos Heights, both of Ill.

[73] Assignee: CPC International Inc., Englewood Cliffs, N.J.

[21] Appl. No.: 575,286

[22] Filed: May 7, 1975

Related U.S. Application Data

[63] Continuation of Ser. No. 432,788, Jan. 11, 1974, which is a continuation-in-part of Ser. No. 117,733, Feb. 21, 1971, abandoned, Ser. No. 244,205, Apr. 14, 1972, Pat. No. 3,832,423, and Ser. No. 282,099, Aug. 21, 1972, Pat. No. 3,786,116.

[51] Int. Cl.² .................... C08L 31/04; C08L 29/04
[52] U.S. Cl. .................... 260/886; 260/29.6 RW; 260/29.6 WA; 260/876 R; 260/878 R; 260/879; 260/880 R; 260/880 B; 260/881; 260/882; 260/883; 260/884; 260/885
[58] Field of Search ............. 260/29.6 RW, 876 R, 260/879, 880, 885, 886, 884, 881, 875

[56] References Cited

U.S. PATENT DOCUMENTS

| 3,235,626 | 2/1966 | Waack | 260/886 |
|---|---|---|---|
| 3,627,837 | 12/1971 | Webb | 260/836 |
| 3,652,520 | 3/1972 | Ryan | 260/94.7 |
| 3,716,506 | 2/1973 | Simms et al. | 260/22 CB |
| 3,832,423 | 8/1974 | Milkovich et al. | 260/878 R |

FOREIGN PATENT DOCUMENTS

595,217  3/1960  Canada .............................. 260/879

OTHER PUBLICATIONS

Greber–Die Makromolekulare Chemie, 101, (1967), pp. 104–144.

*Primary Examiner*—Carman J. Seccuro
*Attorney, Agent, or Firm*—Brumbaugh, Graves, Donohue & Raymond

[57] ABSTRACT

Disclosed are chemically joined, phase separated self-cured hydrophilic thermoplastic graft copolymers which are copolymers of at least one hydrophilic (water-soluble) ethylenically unsaturated monomer or mixtures thereof (or compounds rendered hydrophilic) and at least one copolymerizable hydrophobic macromolecular monomer having a copolymerizable end group which is copolymerizable with said hydrophilic monomer based on the relative reactivity ratios of the respective copolymerizable moieties, said copolymerizable hydrophobic macromolecular monomer being characterized as having a substantially uniform molecular weight distribution such that its ratio of $\overline{M}w/\overline{M}n$ is not substantially above about 1.1, and being further characterized as having a molecular weight of at least about 2,000. The copolymers are water-dispersible and water-swellable and are useful in diverse applications such as suspension stabilizers, flocculants, hydrogels (i.e., biomedical hydrogels as contact lenses, artificial organs, etc.), industrial thickeners, ion exchange resins, drilling mud, and they can impart moisture absorption and water permeability (useful in dialysis tubing) as well as anti-static properties to products.

12 Claims, No Drawings

CHEMICALLY JOINED, PHASE SEPARATED SELF-CURED HYDROPHILIC THERMOPLASTIC GRAFT COPOLYMERS AND THEIR PREPARATION

CROSS-REFERENCE TO RELATED APPLICATIONS

This application is a continuation of copending application Ser. No. 432,788, filed Jan. 11, 1974, which in turn is a continuation-in-part of:

Ser. No. 117,733, filed Feb. 21, 1971, now abandoned;
Ser. No. 244,205, filed Apr. 14, 1972, now U.S. Pat. No. 3,832,423, granted Aug. 27, 1974; and
Ser. No. 282,099, filed Aug. 21, 1972, now U.S. Pat. No. 3,786,116, granted Jan. 15, 1974, the disclosures of which are incorporated herein by reference.

BACKGROUND OF THE INVENTION (a) Statement of the Invention

The present invention relates to chemically joined, phase separated self-cured hydrophilic thermoplastic graft copolymers and their preparation. The hydrophilic copolymers have good wet strength, rendering them useful in diverse applications, particularly in the field of biomedics, e.g., contact lenses and artificial organs.

(b) Description of the Prior Art

Considerable research and development has been devoted to obtaining hydrophilic polymers having sufficient wet strength to render them substantially water-insoluble. For example, one type of hydrophilic polymer having improved wet strength has been disclosed in U.S. Pat. Nos. 2,976,576 and 3,220,960 to Otto Wichterle et al and M. F. Refojo et al, *Journal of Applied Polymer Science*, Vol. 9, pages 2425–2435 (1965). These polymers are prepared by simultaneously polymerizing a water-soluble monoester of acrylic or methacrylic acid in which the ester moiety contains at least one hydrophilic group such as a hydroxy group and cross-linking the monomer as it polymerizes with a polyunsaturated cross-linking agent such as ethylene glycol dimethacrylate. The amount of such cross-linking agent is usually less than about one mole percent of the monoester. Such polymerizations are generally conducted in the presence of a redox initiator.

Hydrophilic polymers having improved wet strength derived from a polymer obtained by copolymerizing a water-soluble vinyl monomer containing at least one nitrogen atom with a small amount of a bifunctional monomer have also been disclosed. These polymers have been suggested as being useful in various biomedical applications due to their compatibility with body tissues and/or mucosa. Some of these polymers are disclosed in U.S. Pat. Nos. 3,639,524 and 3,767,731 to Maurice Seiderman.

One of the factors necessary for the manufacture of these prior art hydrophilic polymers having improved wet strength is the use of a small quantity of a polyunsaturated cross-linking agent. Since the quantity of the cross-linking agent employed is generally very small, the amount can only be varied slightly. Accordingly, it is not possible to effectively tailor the final properties of the hydrophilic polymer by varying the amount of cross-linking agent. Various attempts to avoid this problem have been disclosed in U.S. Pat. No. 3,503,942 to Seiderman and U.S. Pat. No. 3,758,448 to Paul Stamberger.

In co-pending application U.S. Ser. No. 282,099, filed Aug. 21, 1972, the disclosure of which is incorporated herein by reference, there is disclosed the bold and pioneering discovery for preparing chemically joined, phase separated thermoplastic graft copolymers. These copolymers in essence are physically cross-linked (as opposed to chemically cross-linked) type polymers and have been referred to as "self-cured" or "self-reinforced" thermoplastic graft copolymers. This phenomenon is occasioned by providing a controlled dispersion of a macromolecular sidechain in one phase (domain) within the backbone polymer phase (matrix). Because all of the macromolecular monomer sidechain domains are an integral part or interposed between large segments of the backbone polymer, the resulting graft copolymer possesses the properties of a cross-linked polymer, if there is a large difference in the Tg or Tm of the backbone and the sidechain segments. This is true up to the temperature required to break the thermodynamic cross-link of the dispersed phase. In order for the domains of the dispersed phase of the graft copolymers to impart the desired cross-linked or "self-curing" effect, it is important that the macromolecular monomers which comprise the domains of the dispersed phase have substantially the same molecular weight, i.e., the macromolecular monomers must have a $\overline{M}w/\overline{M}n$ ratio which is not substantially above about 1.1. Macromolecular monomers having a broader molecular weight distribution, i.e., a ratio greater than about 1.5 or 2, will ordinarily possess polymeric species of very low molecular weight which impart a "copolymeric" effect on the backbone polymer and polymers of very high molecular weight which will form a second dispersed phase or domain having a size different than the primary dispersed phase. The end result is an opaque polymer of inferior quality with respect to the desired physical properties possessed by the backbone polymer.

BRIEF DESCRIPTION OF THE INVENTION

The present invention is concerned with chemically joined, phase separated self-cured hydrophilic thermoplastic graft copolymers which are water-soluble as well as water-swellable. These novel copolymers are comprised of a copolymer of at least one hydrophilic (water-soluble) ethylenically unsaturated monomer or mixture thereof (or compounds rendered hydrophilic) and at least one copolymerizable hydrophobic macromolecular monomer having a copolymerizable end group which is copolymerizable with said hydrophilic monomer based on the relative reactivity ratios of the respective copolymerizable moieties, said copolymerizable hydrophobic macromolecular monomer being characterized as having a substantially uniform molecular weight distribution such that its ratio of $\overline{M}w/\overline{M}n$ is not substantially above about 1.1, and being further characterized as having a molecular weight of at least about 2,000.

The novel copolymers of the invention are water-dispersible and water-swellable, finding uses in diverse applications such as suspension stabilizers, flocculants, hydrogels (i.e., biochemical hydrogels such as contact lenses, artificial organs, etc.), industrial thickeners, ion exchange resins, and drilling mud. The novel copolymers are capable of imparting moisture absorption and water permeability (useful in dialysis tubing) as well as anti-static properties to a variety of products.

More specifically, the present invention is directed to a chemically joined, phase separated self-cured hydrophilic thermoplastic graft copolymer comprising a copolymer of:
1. at least one copolymerizable normally hydrophobic macromolecular monomer having a substantially uniform molecular weight distribution, and
2. at least one hydrophilic (water-soluble) copolymerizable comonomer or compound rendered hydrophilic forming the polymeric backbone of said copolymer and said copolymerizable normally hydrophobic macromolecular monomer forming linear polymeric sidechains of said graft copolymer, wherein:
    a. the polymeric backbones of the graft copolymer are comprised of polymerized units of said copolymerizable comonomers, said copolymerizable comonomers being at least one ethylenically unsaturated monomer of a hydrophilic or water-soluble compound and mixtures thereof;
    b. the linear polymeric sidechains of the graft copolymer consist essentially of a polymerized hydrophobic macromolecular monomer, said hydrophobic macromolecular monomer comprising a linear polymer or copolymer having a molecular weight of at least about 2,000 and having a substantially uniform molecular weight distribution, such that its ratio of $\overline{M}w/\overline{M}n$ is not substantially above about 1.1, said macromolecular monomer being further characterized as having no more than one copolymerizable moiety per linear polymer or copolymer chain, said copolymerization occurring between the copolymerizable end group of said hydrophobic macromolecular monomer and said copolymerizable hydrophilic comonomer; and
    c. the linear polymeric sidechains of the graft copolymer which are copolymerized into the copolymeric backbone are separated by at least about 20 uninterrupted recurring monomeric units of said hydrophilic polymeric backbone, the distribution of the sidechains along the backbone and the copolymerization being controlled by the reactivity ratios of the copolymerizable end group on said hydrophobic macromolecular monomer and said copolymerizable hydrophilic comonomer.

The graft copolymers of the present invention assume a "T" type structure when only one sidechain is copolymerized into the hydrophilic copolymeric backbone. However, when more than one sidechain is copolymerized into the hydrophilic backbone polymer, the graft copolymer may be characterized as having a comb-type structure illustrated in the following manner:

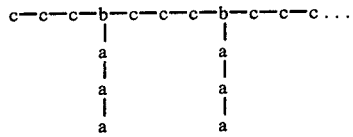

wherein "a" represents a substantially linear, uniform molecular weight normally hydrophobic polymer or copolymer having a sufficient molecular weight such that the physical properties of at least one of the substantially linear hydrophobic polymers is manifest; "b" represents a reacted and copolymerized end group chemically bonded to the sidechain, "a", which is integrally copolymerized into the backbone polymer, and "c" is the hydrophilic backbone polymer having uninterrupted segments of sufficient molecular weight such that the physical properties of the hydrophilic polymer are manifest.

The backbone of the graft copolymers of the present invention preferably contain at least about 20 uninterrupted recurring monomeric units in each segment and, preferably, at least about 30 uninterrupted recurring monomeric units in each segment. It has been found, however, that at least about 100 uninterrupted recurring monomeric units in each segment provide particularly desirable physical properties. It has been found that this condition provides a graft copolymer possessing the properties of the backbone hydrophilic polymer. In other words, the presence of segments containing at least about 20 uninterrupted recurring monomeric units provides the graft copolymers with the physical properties attributed to the polymeric backbone, such as water compatibility and water-swelling properties.

The backbone polymeric segments of the chemically joined, phase separated self-cured hydrophilic thermoplastic graft copolymers of the present invention are derived from copolymerizable comonomers, preferably the low molecular weight comonomers. These copolymerizable comonomers include polycarboxylic acids, their anhydrides and amides, polyisocyanates, organic epoxides, including the thioepoxides, ureaformaldehydes, siloxanes, and ethylenically unsaturated monomers. A particularly preferred group of copolymerizable monomers includes the ethylenically unsaturated monomers, especially the monomeric vinylidene type compounds, i.e., monomers containing at least one vinylidene

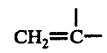

group. The vinyl type compounds represented by the formula

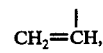

wherein a hydrogen is attached to one of the free valences of the vinylidene group, are contemplated as falling within the generic scope of the vinylidene compounds referred to hereinabove.

The copolymerizable comonomers useful in the practice of the present invention are not limited by the exemplary classes of compounds mentioned above. The only limitation on the particular comonomers to be employed is their capability to copolymerize with the copolymerizable end groups of the sidechain prepolymer under free-radical, ionic, condensation, or coordination (Ziegler or Ziegler-Natta catalysis) polymerization reactions. The only other limitation with respect to the low molecular weight comonomers is that they possess a functional moiety which renders them hydrophilic or a functional moiety with can be made hydrophilic by a subsequent or post reaction. A particularly preferred example of this latter group of compounds comprises vinyl esters such as vinyl acetate. The vinyl esters are copolymerized with the copolymerizable hydrophobic macromolecular monomer having a copolymerizable double bond at its molecular chain end and following the copolymerization, the resulting graft copolymer is saponified to render the polymeric backbone hydrophilic. In other words, the polymeric backbone is comprised of polyvinyl alcohols.

As it will be seen from the description of the copolymerizable macromolecular monomers, described hereinbelow, the choice of the copolymerizable end groups includes any copolymerizable comonomer commercially available. Accordingly, the choice of respective copolymerizable end group on the macromolecular monomer and the copolymerizable comonomer can be chosen, based upon relative reactivity ratios under their respective copolymerization reaction conditions suitable for copolymerization. Thus, by simple inspection of the reactivity of various comonomer pairs in the literature, one is able to provide the appropriate end group on the macromolecular monomer and the copolymerizable comonomer. Preferably, the $r$ values for the respective copolymerizable moieties will be as close to unity as possible, as is well-known to those skilled in the art of copolymerization. For example, an acrylate or methacrylate terminated macromolecular monomer copolymerizes with acrylates and methacrylates under free-radical conditions in a manner governed by the respective reactivity ratios for the comonomers.

As will be explained hereinafter, the excellent combination of beneficial properties possessed by the graft copolymers of the present invention is attributed to the large segments of uninterrupted copolymeric hydrophilic backbones and the integrally copolymerized linear hydrophobic polymeric sidechains of controlled molecular weight and narrow molecular weight distribution.

The term "linear" referred to hereinabove, is being used in its conventional sense, to pertain to a polymeric backbone that is free from cross-linking.

The term "hydrophilic" referred to hereinabove, is being used in its conventional sense, to pertain to a polymeric or monomeric substance or system which absorbs or adsorbs water.

The term "hydrophobic" referred to hereinabove, is being used in its conventional sense, to pertain to a polymeric substance which repels water.

The sidechain polymers having substantially uniform molecular weight are comprised of substantially linear hydrophobic polymers and copolymers produced by anionic polymerization of any anionically polymerizable monomer or mixture thereof which produce a polymer which is hydrophobic. The sidechain polymer will obviously be different than the hydrophilic backbone polymer.

It is preferred that at least one segment of the sidechain polymer of the graft copolymers of the present invention have a molecular weight sufficient to manifest the beneficial properties of the respective polymers. In other words, physical properties of the sidechain polymers such as the glass transition temperature (Tg) will be manifest. The molecular weight of the polymer sidechains will generally be at least about 2,000 and, preferably, the polymers will have a molecular weight in the range of from about 5,000 to about 50,000. Particularly desirable results have been found when the polymeric sidechains have a molecular weight in the range of from about 10,000 to about 35,000 and, more preferably, in the range of from about 12,000 to about 25,000.

In light of the unusual and improved physical properties possessed by the thermoplastic graft copolymers of the present invention, it is believed that the monofunctionally bonded polymeric sidechains having substantially uniform molecular weight form what is known as "domains" which appear as dispersed droplets precipitated within the matrix of the polymeric backbone. Since the domains or droplets are microscopic, they are generally below the wavelength of light of the backbone polymer. The ultimate graft copolymer is clear or transparent. The hydrophobic polymeric sidechains which provide the self-curing or self-reinforcing effect on the hydrophilic polymeric backbone improve the wet strength of the ultimate polymer.

DESCRIPTION OF THE PREFERRED EMBODIMENTS

The Copolymerizable Hydrophobic Macromolecular Monomers

The hydrophobic polymeric sidechains of the chemically joined, phase separated self-cured hydrophilic graft copolymers, above, are preferably prepared by the anionic polymerization of a polymerizable monomer or combination of monomers. In most instances, such monomers are those having an olefinic group, such as the vinyl containing compounds, although the olefinic containing monomers may be used in combination with epoxy or thioepoxy containing compounds.

The first step in preparing the copolymerizable hydrophobic macromolecular monomers is to prepare living polymers. The living polymers are conveniently prepared by contacting the monomer with an alkali metal hydrocarbon or alkoxide salts in the presence of an inert organic diluent which does not precipitate in or interfere with the polymerization reaction.

Those monomers susceptible to anionic polymerization are well-known and the present invention contemplates the use of all anionically polymerizable monomers which provide a substantially hydrophobic polymer at a molecular weight of at least about 2,000. Nonlimiting illustrative species include vinyl aromatic compounds, such as styrene, alpha-methylstyrene, vinyl toluene and its isomers; acenaphthalene; acrylonitrile and methacrylonitrile; organic isocyanates including lower alkyl, phenyl, lower alkyl phenyl and halophenyl isocyanates, organic diisocyanates including lower alkylene, phenylene and tolylene diisocyanates; lower alkyl and allyl acrylates and methacrylates, including methyl, t-butyl acrylates and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl oleate, vinyl stearate, vinyl benzoate, vinyl lower alkyl ethers; conjugated dienes including isoprene and butadiene. The term "lower" is used above to denote organic groups containing eight or fewer carbon atoms.

The preferred olefinic containing monomers suitable for preparing the hydrophobic macromolecular monomers are the conjugated dienes containing 4 to 12 carbon atoms per molecule and the vinyl-substituted aromatic hydrocarbons containing up to about 12 carbon atoms. Particularly preferred monomers include styrene, alpha-methylstyrene, butadiene and isoprene.

Many other monomers suitable for the preparation of the sidechains by anionic polymerization are those disclosed in *Macromolecular Reviews:* Volume 2, pages 74–83, Interscience Publishers, Inc. (1967), entitled "Monomers Polymerized by Anionic Initiators," the disclosure of which is incorporated herein by reference.

The initiators for these anionic polymerizations are any alkali metal hydrocarbons and alkoxide salts which produce a monofunctional living polymer, i.e., only one end of the polymer contains a reactive anion. Those catalysts found suitable include the hydrocarbons of lithium, sodium or potassium as represented by the formula RMe wherein Me is an alkali metal such as sodium, lithium or potassium and R represents a hydrocarbon radical, for example, an alkyl radical containing up to about 20 carbon atoms or more, and preferably, up to about eight carbon atoms, an aryl radical, an alkaryl radical or an aralkyl radical. Illustrative alkali metal hydrocarbons include ethyl sodium, n-propyl sodium, n-butyl potassium, n-octyl potassium, phenyl sodium, ethyl lithium, sec-butyl lithium, t-butyl lithium and 2-ethylhexyl lithium. Sec-butyl lithium is the preferred initiator because it has a fast initiation which is important in preparing polymers of narrow molecular weight distribution. It is preferred to employ the alkali metals salts of tertiary alcohols, such as potassion t-butyl alkoxylate, when polymerizing monomers having a nitrile or carbonyl functional group.

The alkali metal hydrocarbons and alkoxylates are either available commercially or may be prepared by known methods, such as by the reaction of a halohydrocarbon, halobenzene or alcohol and the appropriate alkali metal.

An inert solvent generally is used to facilitate heat transfer and adequate mixing of initiator and monomer. Hydrocarbons and ethers are the preferred solvents. Solvents useful in the anionic polymerization process include the aromatic hydrocarbons such as benzene, toluene, xylene, ethylbenzene, t-butylbenzene, etc. Also suitable are the saturated aliphatic and cycloaliphatic hydrocarbons such as n-hexane, n-heptane, n-octane, cyclohexane and the like. In addition, aliphatic and cyclic ether solvents can be used, for example, dimethyl ether, diethyl ether, dibutyl ether, tetrahydrofuran, dioxane, anisole, tetrahydropyran, diglyme, glyme, etc. The rates of polymerization are faster in the ether solvents than in the hydrocarbon solvents, and small amounts of ether in the hydrocarbon solvent increase the rates of polymerization.

The amount of initiator is an important factor in anionic polymerization because it determines the molecular weight of the living polymer. If a small proportion of initiator is used, with respect to the amount of monomer, the molecular weight of the living polymer will be larger than if a large proportion of initiator is used. Generally, it is advisable to add initiator dropwise to the monomer (when that is the selected order of addition) until the persistence of the characteristic color of the organic anion, then add the calculated amount of initiator for the molecular weight desired. The preliminary dropwise addition serves to destroy contaminants and thus permits better control of the polymerization.

To prepare a polymer of narrow molecular weight distribution, it is generally preferred to introduce all of the reactive species into the system at the same time. By this technique, polymer growth by consecutive addition of monomer takes place at the same rate to an active terminal group, without chain transfer or termination reaction. When this is accomplished, the molecular weight of the polymer is controlled by the ratio of monomer to initiator, as seen from the following representation:

$$\text{Molecular Weight Of Living Polymer} = \frac{\text{Moles of Monomer}}{\text{Moles of Initiator}} \times \text{Molecular Weight Of Monomer}$$

As it can be seen from the above formula, high concentrations of initiator leads to the formation of low molecular weight polymers, whereas, low concentrations of initiator leads to the production of high molecular weight polymers.

The concentration of the monomer charged to the reaction vessel can vary widely, and is limited by the ability of the reaction equipment to dissipate the heat of polymerization and to properly mix the resulting viscous solutions of the living polymer. Concentrations of monomer as high as 50% by weight or higher based on the weight of the reaction mixture can be used. However, the preferred monomer concentration is from about 5% to about 25% in order to achieve adequate mixing.

As can be seen from the formula above and the foregoing limitations on the concentration of the monomer, the initiator concentration is critical, but may be varied according to the desired molecular weight of the living polymer and the relative concentration of the monomer. Generally, the initiator concentration can range from about 0.001 to about 0.1 mole of active alkali metal per mole of monomer, or higher. Preferably, the concentration of the initiator will be from about 0.01 to about 0.004 mole of active alkali metal per mole of monomer.

The temperature of the polymerization will depend on the monomer. Generally, the reaction can be carried out at temperatures ranging from about $-100°$ C up to about $100°$ C. When using aliphatic and hydrocarbon diluents, the preferred temperature range is from about $-10°$ C to about $100°$ C. With ethers as the solvent, the preferred temperature range is from about $-100°$ C to about $100°$ C. The polymerization of the styrene is generally carried out at slightly above room temperature; the polymerization of alpha-methylstyrene preferably is carried out at lower temperatures, e.g., $-80°$ C.

The preparation of the living polymer can be carried out by adding a solution of the alkali metal hydrocarbon initiator in an inert organic solvent to a mixture of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to a living polymer as long as the system remains free of impurities which inactivate the anionic species. As pointed out above, however, it is important to add all of the reactive ingredients together rapidly to insure the formation of a uniform molecular weight distribution of the polymer.

The anionic polymerization must be carried out under carefully controlled conditions, so as to exclude substances which destroy the catalytic effect of the catalyst or initiator. For example, such impurities as water, oxygen, carbon monoxide, carbon dioxide, and the like. Thus, the polymerizations are generally carried out in dry equipment, using anhydrous reactants, and under an inert gas atmosphere, such as nitrogen, helium, argon, methane, and the like.

The above-described living polymers are susceptible to further reactions including further polymerization. Thus, if additional monomer, such as styrene, is added to the living polymer, the polymerization is renewed and the chain grows until no more monomeric styrene remains. Alternatively, if another different anionically polymerizable monomer is added, such as butadiene or ethylene oxide, the above-described living polymer initiates the polymerization of the butadiene or ethylene oxide and the ultimate living polymer which results consists of a polystyrene segment and a polybutadiene or polyoxyethylene segment.

A diblock hydrophobic copolymer can be prepared by contacting the first living polymer, e.g., a living polymer of a vinyl aromatic compound such as living polystyrene or living poly(alpha-methylstyrene) with another anionically polymerizable monomer, e.g., the conjugated diene such as butadiene or isoprene. In this manner, a living diblock polymer is obtained which can be terminated by the methods in accordance with the practice of the present invention. Utilizing this technique, a living diblock polymer of the following formula can be obtained:

wherein A is a polymeric block of a vinyl aromatic compound and B is a polymeric block of a conjugated diene. Copolymerizable macromolecular monomers which have a diblock structure are disclosed in copending application Ser. No. 347,116, now U.S. Pat. No. 3,842,146 granted Oct. 15, 1974 the disclosure of which is incorporated herein by reference.

As noted above, the living polymers employed in the present invention are characterized by relatively uniform molecular weight, i.e., the distribution of molecular weights of the mixture of living polymers produced is quite narrow. This is in marked contrast to the typical polymer, where the molecular weight distribution is quite broad. The difference in molecular weight distribution is particularly evident from an analysis of the gel permeation chromatogram commercial polystyrene (Dow 666u) prepared by free-radical polymerization and polystyrene produced by the anionic polymerization process utilized in accordance with the practice of the present invention. Thus, the living polymers prepared in accordance with the teachings of the present invention are characterized by having a $\overline{Mw}/\overline{Mn}$ ratio which is not substantially above about 1.1, where $\overline{Mw}$ is the weight average molecular weight of the living polymer, and $\overline{Mn}$ is the number average molecular weight of the living polymer, as determined by ordinary analytical techniques such as gel permeation chromatography (GPC).

The living polymers herein are terminated by reaction with a halogen containing compound which also contains a polymerizable moiety, such as an olefinic group or an epoxy or thioepoxy group. Suitable halogen containing terminating agents include: the vinyl haloalkyl ethers wherein the alkyl groups contain six or fewer carbon atoms such as methyl, ethyl, propyl, butyl, isobutyl, sec-butyl, amyl or hexyl; vinyl esters or haloalkanoic acids wherein the alkanoic acid contains six or fewer carbon atoms, such as acetic, propanoic, butyric, pentanoic, or hexanoic acid; olefinic halides having six or fewer carbon atoms such as vinyl halide, allyl halide, methallyl halide, 6-halo-1-hexene, etc.; halides of dienes such as 2-halomethyl-1,3-butadiene, epihalohydrins, acrylyl and methacrylyl halides, haloalkylmaleic anhydrides, haloalkylmaleate esters; vinyl haloalkylsilanes; vinyl haloaryls; and vinyl haloalkaryls, such as vinylbenzyl chloride (VBC); haloalkyl norbornenes, such as bromethyl norbornene, bromonorbornane, and epoxy compounds such as ethylene or propylene oxide. The halo group may be chloro, fluoro, bromo, or iodo; preferably, it is chloro. Anhydrides of compounds having an olefinic group or an epoxy or thioepoxy group may also be employed, such as maleic anhydride, acrylic or methacrylic anhydride.

Termination of the living polymer is accomplished simply by adding the terminating agent to the solution of living polymer at the temperature at which the living polymer is prepared. Reaction is immediate and the yield is theoretical. A slight molar excess of the terminating agent, with respect to the amount of anionic initiator, may be used although the reaction proceeds on a mole-for-mole basis.

The termination may be conducted in any suitable inert solvent. Generally, it is advisable to utilize the same solvent system employed in the preparation of the living polymer. A preferred embodiment of the invention comprises conducting the termination reaction in a hydrocarbon solvent rather than the polar ether type solvents such as tetrahydrofuran. It has been found that the hydrocarbon solvents such as the aromatic hydrocarbons, saturated aliphatic and cycloaliphatic hydrocarbons cause several differences in the reaction conditions and the resulting product. For example, the termination reaction can be conducted at higher temperatures with hydrocarbon solvents as opposed to the ether solvents.

In some instances, because of the nature of the living polymer and the monomer from which it is prepared, or because of the nature of the terminating agent, certain deleterious side reactions occur which result in an impure product. For example, the carbanion of some living polymers has a tendency to react with functional groups or any active hydrogens of the terminating agent. Thus, for example, acrylyl or methacrylyl chloride while they act as terminating agents because of the presence of the chlorine atom in their structure, also provide a carbonyl group in the terminated polymer chain, and this carbonyl group may provide a center for attack by a second highly reactive living polymer. The resulting polymer either has twice the expected molecular weight or contains some chlorine, indicating that some of the living polymer has been terminated by reaction with a second living polymer or with one of the active hydrocarbons of the acrylyl or methacrylyl chloride.

It has been discovered that one means for overcoming the foregoing problem is to render the reactive carbanion less susceptible to reaction with the functional groups or any active hydrogens of a terminating agent. A preferred method to render the living polymer less susceptible to the adverse reaction is to "cap" the highly reactive living polymer with a lesser reactive reactant. Examples of some preferred "capping agents" include the lower alkylene oxides, i.e., one having eight or fewer carbon atoms such as ethylene and propylene oxide; diphenyl ethylene, etc. The "capping" reaction yields a product which still is a living polymer, but yields a purer product when subsequently reacted with a terminating agent containing a functional group or active hydrogen.

It has been found that diphenyl ethylene is an excellent "capping agent" when terminating agents such as, for example, vinyl chloroalkanoates, are employed.

A particularly preferred "capping agent" is an alkylene oxide, such as ethylene oxide. It reacts with the living polymer, with the destruction of its oxirane ring. The following is a typical illustration of the "capping reaction" which shows the reaction of ethylene oxide as a capping agent with a living polymer prepared by the polymerization of styrene with sec-butyl lithium as the initiator:

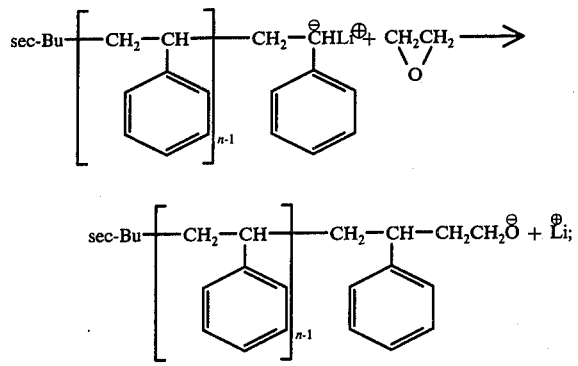

The capping reaction is carried out quite simply, as in the case of the terminating reaction, by adding the capping reactant to the living polymer at polymerization temperatures. The reaction occurs immediately. As in the case of the termination reaction, a slight molar excess of the capping reactant with respect to the amount of initiator may be used. The reaction occurs on a mole-for-mole basis.

It will be understood that when a large molar excess of alkylene oxide is reacted with the living polymer, a living polymer having two polymeric blocks is produced. A typical example with polystyrene segments and polyoxyalkylene segments is illustrated as follows:

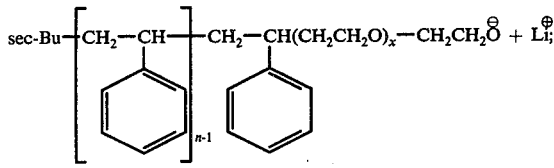

wherein x is a positive integer.

Either of the above-described ethylene oxide "capped" polymers can be conveniently terminated with a compound containing a moiety reactive with the anion of the capped polymer and a polymerizable and group, including the following typical compounds: acrylyl chloride, methacrylyl chloride, vinyl-2-chloroethyl ether, vinyl chloroacetate, chloromethylmaleic anhydride and its esters, maleic anhydride (yields half ester of maleic acid following protonation with water), allyl and methallyl chloride and vinylbenzyl chloride.

The reaction of the above-described "capped" living polymers with either acrylyl or methacrylyl chloride can be represented by the following reactions:

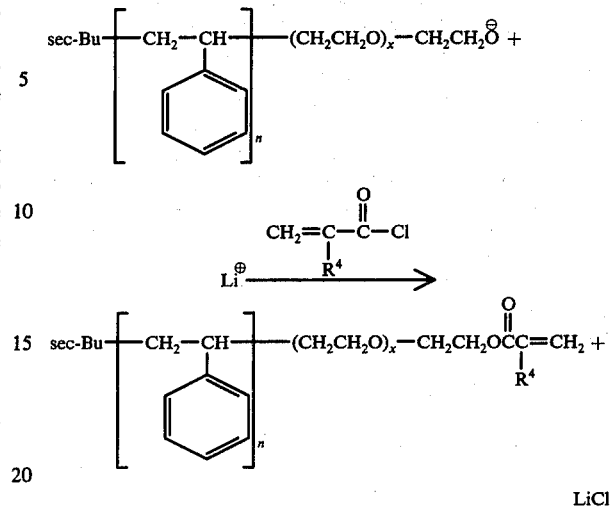

wherein n is a positive integer of about at least 50, x is either zero or a positive integer and $R^4$ is either hydrogen or methyl.

When an epihalohydrin is used as the terminating reagent, the resulting polymer contains a terminal epoxy group. This terminal epoxy may be used as the polymerizable group itself, such as in the preparation of a polypropylene oxide backbone graft copolymer or may be converted to various other useful polymerizable end groups by any one of several known reactions.

As one embodiment of the invention, the terminated living polymer containing an epoxy or thioepoxy end group may be reacted with a polymerizable carboxylic acid halide, such as acrylic, methacrylic, or maleic acid halide, to produce a beta-hydroxyalkyl acrylate, methacrylate or maleate ester as the polymerizable terminal moiety of the substantially uniform molecular weight polymer. These same polymerizable esters may be prepared from the terminal epoxy polymer by first converting the epoxy group to the corresponding glycol by warming the polymer with aqueous sodium hydroxide, followed by conventional esterification of the glycol end group with the appropriate polymerizable carboxylic acid, or acid halide.

The resulting glycol obtained by the aqueous hydrolysis of the epoxy group in the presence of a base may be converted to a copolymer by reaction with a high molecular weight dicarboxylic acid which may be prepared, e.g., by the polymerization of a glycol or diamine with a molar excess of phthalic anhydride, maleic anhydride, succinic anhydride, or the like. These reactions can be modified to obtain a polystyrene block and a polyamide block (Nylon). The glycol terminated polymer may also be reacted with a diisocyanate to form a polyurethane. The diisocyanate may be e.g., the reaction product of a polyethylene glycol having an average molecular weight of 400 with a molar excess of phenylene diisocyanate.

In another embodiment of the invention, an organic epoxide is copolymerized with a terminal polymer containing an epoxy or thioepoxy end group. The graft copolymer which results is characterized by a backbone having uninterrupted segments of at least about 20, and preferably, at least about 30 recurring units of the organic epoxide. Preferred organic epoxides include ethylene oxide, cyclohexene epoxide and styrene oxide, i.e., those having eight or fewer carbon atoms. By simply hydrolysis, the backbone polymer may be rendered hydrophilic.

If it is desired to isolate and further purify the macromolecular monomer from the solvent from which it was prepared, any of the known techniques used by those skilled in the art in recovering polymeric materials may be used. These techniques include: (1) solvent-non-solvent precipitation; (2) evaporation of solvent in an aqueous media; and (3) evaporation of solvent, such as by vacuum roll drying, spray drying, freeze drying; and (4) steam jet coagulation.

The isolation and recovery of the macromolecular monomer is not a critical feature of the invention. In fact, the macromolecular monomer need not be recovered at all. Stated otherwise, the macromolecular monomer, once formed, can be charged with the suitable monomer and polymerization catalyst to conduct the graft copolymerization in the same system as the macromolecular monomer was prepared, providing the solvent and materials in the macromolecular monomer preparation reactor do not poison the catalyst or act in a deleterious manner to the graft copolymerization process. Thus, a judicious selection of the solvent and purification of the reactor system in the preparation of the macromolecular monomer can ultimately result in a large savings in the production of the graft copolymers of the present invention.

As pointed out above, the macromolecular monomers, which ultimately become the sidechains of the graft copolymers by being integrally polymerized into the backbone polymer, must have a narrow molecular weight distribution. Methods for determining the molecular weight distribution of polymers such as the macromolecular monomers are known in the art. Using these known methods, the weight average molecular weight ($\overline{M}w$) and the number average molecular weight ($\overline{M}n$) can be ascertained, and the molecular weight distribution ($\overline{M}w/\overline{M}n$) for the macromolecular monomer can be determined. The macromolecular monomers must have nearly a Poisson molecular weight distribution or be virtually monodisperse in order to have the highest degree of functionality, i.e., the ratio of $\overline{M}w/\overline{M}n$ will not be substantially above about 1.1. Preferably, the ratio of $\overline{M}w/\overline{M}n$ of the novel macromolecular monomers will be less than about 1.1. The macromolecular monomers of the present invention possess the aforementioned narrow molecular weight distribution and purity due to the method of their preparation, described hereinabove. Thus, it is important that the sequence of steps in preparing the macromolecular monomers be adhered to in order to produce the optimum results in beneficial properties in the graft copolymers.

As it is apparent from the foregoing disclosure, the hydrophobic copolymerizable macromolecular monomers contemplated by the present invention are generally represented by the structural formula:

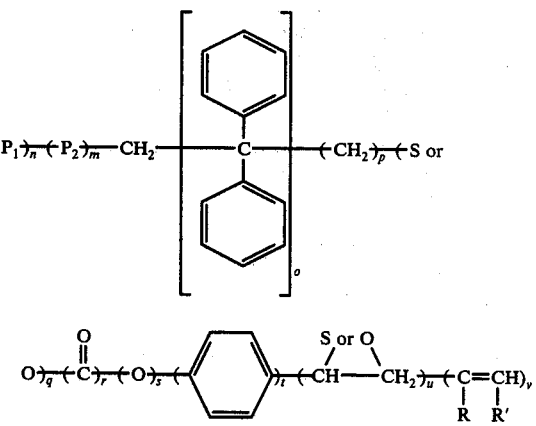

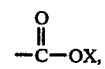

wherein I is the residue of the monofunctional anionic initiator, $P_1$ is at least one anionically polymerized monomer, $P_2$ is at least one anionically polymerized monomer which is the same or different than $P_1$; R is either hydrogen or lower alkyl, R' is either hydrogen or $$-\overset{O}{\underset{\|}{C}}-OX,$$

wherein X is either hydrogen, lower alkyl or a monovalent metal; n is a positive integer of at least about 20, m is either zero or a positive integer, the sum of n and m is such that the molecular weight of the macromolecular monomer is at least about 2,000 and, preferably, 5,000 to about 50,000, o, q, r and s are either zero or 1, and p is either zero or a positive integer in the range of from 1 to about 8, with the proviso that when o and p are 1, q is zero, r is zero or 1, s is zero or 1, and t is zero; when o is zero, p can be a positive integer and q, r, s and t can be zero or 1; when o, q, r, s and t are zero, p is a positive integer, and s can be zero or 1, and u and v are either zero or 1, with the proviso that when u is 1, v is zero and when v is 1, u is zero, said copolymerizable macromolecular monomer being denoted as having a substantially uniform molecular weight distribution such that its ratio of $\overline{M}w/\overline{M}n$ is not substantially above about 1.1, wherein $\overline{M}w$ is the weight average molecular weight of the monomer, and $\overline{M}n$ is the number average molecular weight of the monomer.

As previously mentioned, $P_1$ and $P_2$ are preferably polymers of vinyl aromatic compounds and conjugated dienes.

THE COPOLYMERIZABLE HYDROPHILIC (WATER-SOLUBLE) COMPOUNDS

The copolymerizable comonomers which are suitable in obtaining the hydrophilic polymeric backbone of the graft copolymers of the present invention must be water-soluble or capable of being rendered watersoluble after copolymerization. These compounds should be capable of copolymerization to a water-soluble material or one which is capable of being rendered water-soluble. The term "water-soluble" is referred to herein to include those compositions wherein at least about 10% by weight and, preferably, at least 30% by weight is uniformly miscible in water at room temperature. Suitable copolymerizable monomers contemplated for use in preparing the hydrophilic polymeric backbone of the graft copolymers of the present invention include:

acrylic and methacrylic acid,
water-soluble monoesters of acrylic and methacrylic acid in which the ester moiety contains at least one hydrophilic group such as a hydroxy group, i.e., the hydroxy lower alkyl acrylates and methacrylates, typical examples of which include:
2-hydroxyethyl acrylate,
2-hydroxyethyl methacrylate,
2-hydroxypropyl acrylate,
2-hydroxypropyl methacrylate,
3-hydroxypropyl acrylate,
3-hydroxypropyl methacrylate,
diethylene glycol monomethacrylate,
diethylene glycol monoacrylate,
dipropylene glycol monomethacrylate, and
dipropylene glycol monoacrylate.
water-soluble vinyl monomers having at least one nitrogen atom in the molecule, examples of which include:
acrylamide,
methacrylamide,
methylolacrylamide,
methylolmethacrylamide, p1 diacetone acrylamide
N-methylacrylamide,
N-ethylacrylamide,
N-hydroxyethyl acrylamide,
N,N-disubstituted acrylamides, such as N,N-dimethylacrylamide, N,N-diethylacrylamide, N-ethylmethylacrylamide, N,N-dimethylolacrylamide and N,N-dihydroxyethyl acrylamide
heterocyclic nitrogen containing compounds such as N-pyrrolidone, N-vinyl piperidone, N-acryloylpyrriolidone, N-acryloylpiperidine, and N-acryloylmorpholene cationic functional monomers may also be employed, for example, vinyl pyridene quaternary ammonium salts and dimethyl aminoethyl methacrylate quaternary ammonium salts and compounds known by the tradename Sipomer Q-1.

A particularly preferred class of compositions include those which are capable of being rendered hydrophilic in a post-polymer reaction. For example, vinyl esters of carboxylic acids such as vinyl formate, vinyl acetate, vinyl monochloroacetate, and vinyl butyrate, may be copolymerized with the afore-described copolymerizable macromolecular monomers and subsequent to the copolymerization reaction, the polymeric backbone containing repeating monomeric units of these vinyl esters of carboxylic acids can be rendered hydrophilic by hydrolysis to the resulting polyvinyl alcohol. In other words, the polymeric backbone is comprised of a polyvinyl alcohol.

The above-described hydrophilic monomers are those which may be rendered hydrophilic by a post reaction may be employed alone, or in combination, or as interpolymers with other copolymerizable comonomers. The copolymerizable monomers employed in admixture or in combination with the hydrophilic monomers, or those which may be rendered hydrophilic, may be any ethylenically unsaturated monomer which may include a combination of hydrophilic monomers or a hydrophobic monomer and the "hydrophobic copolymerizable macromolecular monomer." Suitable hydrophobic copolymerizable monomers which may be interpolymerized with the afore-described "hydrophobic copolymerizable macromolecular monomer" and the afore-described "hydrophilic copolymerizable comonomers" include the alkyl acrylate and methacrylates, e.g., methylacrylate or methacrylate, ethylacrylate or methacrylate, propylacrylate or methacrylate, ethylacrylate or methacrylate, propylacrylate or methacrylate, butylacrylate or methacrylate, butylacrylate being preferred. Other suitable hydrophobic copolymerizable comonomers include vinyl chloride, vinylidene chloride, acrylonitrile, methacrylonitrile, vinylidene cyanide, vinyl acetate, vinyl propionate, and vinyl aromatic compounds such as styrene and alpha-methylstyrene, and maleic anhydride.

The preferred classes of comonomers which are useful in preparing the hydrophilic polymeric backbone of the graft copolymers of the present invention include the monoesters of either acrylic and/or methacrylic acid and a polyhydric alcohol, such as 2-hydroxyethyl acrylate and methacrylate; the N,N-disubstituted acrylamides such as N,N-dimethylacrylamide, particularly when used in combination with butylacrylate as another comonomer; and vinyl esters of monocarboxylic acids such as vinyl acetate, which is saponified with an alkali following the copolymerization reaction.

The aforementioned "copolymerizable hydrophobic copolymerizable macromolecular monomer" which is copolymerized with the copolymerizable comonomer which forms the hydrophilic copolymeric backbone should be present in amounts ranging from about 1% to about 95% by weight, based on the copolymerizable comonomer forming the hydrophilic polymeric backbone. Stated otherwise, the chemically joined, phase separated thermoplastic graft copolymers having hydrophilic polymeric backbones are comprised of (1) from about 1% to about 95% by weight of the copolymerizable hydrophobic macromolecular monomer having a narrow molecular weight distribution, and (2) from about 99% to about 5% by weight of the copolymerizable comonomer which forms the hydrophilic polymeric backbone. Preferably, the graft copolymer will contain up to about 60% by weight and, more preferably, from about 2% to about 40% by weight of the abovedescribed hydrophobic macromolecular monomer to achieve the ultimate mechanical strength of the polymer.

The copolymerization of the copolymerizable hydrophobic macromolecular monomer and the copolymerizable comonomer which forms the hydrophilic polymeric backbone of the graft copolymer (and, optionally, a small amount of the suitable comonomer or modifier monomer as sometimes referred to in the art) can be performed by solution polymerization, emulsion polymerization, bulk polymerization, suspension polymerization, and non-aqueous suspension polymerization.

It is generally desirable after the completion of the copolymerization reaction to remove any copolymerizable hydrophobic macromolecular monomer which has remained unreacted in the polymerization system. The removal of the macromolecular monomer can be accomplished by any suitable means such as solvent extraction.

If desired, particularly in the case of bulk polymerization, the copolymerization can be carried out in a shaped mold such as a contact lens mold. In such an instance, a cross-linking agent may be added to the copolymerization reaction to further improve the wet strength properties of the graft copolymer. Suitable cross-linking agents for this purpose includes ethylene glycol dimethacrylate, diethylene glycol dimethacrylate, divinylbenzene and N,N-methylene-bis-methacrylamide. The amount of cross-linking agent employed generally depends on the degree of cross-linking desired. Suitable amounts of cross-linking agents may range from about 0.1% to about 2% by weight or, generally, less than about one mole percent based on the weight of the monomer which forms the hydrophilic polymeric backbone.

If a polymerization catalyst is employed for the copolymerization, the polymerization environment suitable for the catalyst should be employed. For example, oil- or solvent-soluble peroxides such as benzoyl peroxide, are generally effective when the copolymerizable hydrophobic macromolecular monomer is copolymerized with an ethylenically unsaturated comonomer in bulk, in solution in an organic solvent such as benzene, cyclohexane, toluene, xylene, etc., or in aqueous suspension. Water-soluble peroxides, such as sodium, potassium, lithium and ammonium persulfates, etc. are useful in aqueous suspension and emulsion systems. In the copolymerization of many of the copolymerizable hydrophobic macromolecular monomers, such as those with an ethylenically unsaturated end group and a polystyrene, polyisoprene, or polybutadiene repeating unit, an emulsifier or dispersing agent may be employed in an aqueous suspension system. In these systems, particular advantage can be achieved by dissolving the water-insoluble polymerizable macromolecular monomer in a small amount of a suitable solvent, such as a hydrocarbon. By this novel technique, the comonomer copolymerizes with the polymerizable macromolecular monomer in the solvent, in an aqueous system surrounding the solvent-polymer system. Of course, the polymerization catalyst is chosen such that it will be soluble in the organic phase of the polymerization system.

The polymerization catalyst employed can be any of the catalysts which are suitable in polymerizing compounds containing ethylenic unsaturation (providing the above criteria are met), and preferably are the free-radical catalysts. Of particular interest are catalysts such as azobisisobutyronitrile and peroxide catalysts. Some examples of suitable peroxide catalysts include hydrogen peroxide, benzoyl peroxide, tert-butyl peroctoate, phthalic peroxide, succinic peroxide, benzoyl acetic peroxide, coconut oil acid peroxide, lauric peroxide, stearic peroxide, maleic peroxide, tert-butyl hydroperoxide, di-tertbutyl peroxide, and the like.

The preferred catalyst is one which is effective at moderately low temperatures such as about 45°–85° C.

In addition to the free-radical polymerization catalysts, the catalysts can include those materials which polymerize primarily by opening of the epoxide group, such as the epoxy terminated copolymerizable hydrophobic macromolecular monomer. Such catalysts include p-toluene sulfonic acid, sulfuric acid, phosphoric acid, aluminum chloride, stannic chloride, ferric chloride, boron trifluoride, boron trifluoride-ethyl ether complex, and iodine. It may be desirable to employ a multi-stage polymerization process.

The amount of catalyst employed depends upon the type of catalyst system used and is generally from about 0.1 to about 10 parts by weight per 100 parts of comonomeric mixture and is preferably from about 0.1 to about 1 part by weight per 100 parts of comonomeric mixture.

The copolymerization is generally carried out at a temperature of from about room temperature to about 165° C. However, it is generally preferred to initiate the polymerization at a relatively low temperature, such as from about 40° C to about 85° C and then increase the temperature to about 90° C to about 165° C as the reaction continues and preferably, after most of the reaction has been completed. The most preferred initial temperature range of polymerization is between about 45° C and 70° C. Usually the polymerization is conducted under autogenous pressure in a closed reaction vessel. However, any suitable means to prevent significant evaporation of any of the monomers can be employed.

The copolymerization is generally completed in about 4 to about 48 hours and, preferably, is completed in about 6 to about 24 hours. It is understood, of course, that the time and temperature are inversely related. That is, temperature employed at the upper end of the temperature range will provide polymerization processes which can be completed near the lower end of the time range.

Subsequent to the copolymerization, the graft copolymer may be post-cured by any suitable means if desired. However, due to the self-reinforcing and self-curing effect of the graft copolymers of the present invention, such post-curing is generally not necessary, except for in uses where extreme strength is required. In the event a post-curing reaction is desired, this may be conducted in a mold or cast conforming to the general or exact shape and/or size of the desired product. After the polymer is completed, including any post-curing, a firm, rigid and clear copolymer is obtained. The fabricated product can then be swelled in a suitable liquid until equilibrium is reached or until a hydrogel containing the desired amount of liquid, such as aqueous liquid, is reached. In addition, it should be known that the hydrogels can be obtained by swelling the polymers of the present invention with water-soluble swelling agents instead of aqueous solutions. Some examples of water-soluble swelling agents include ethylene glycol, the liquid polyethylene glycols, the glycol esters of lactic acid, formamide, dimethyl formamide, dimethyl sulfoxide, and the like.

The copolymers of the present invention, in addition to being formed in situ can be processed by compression molding, extrusion molding, or injection molding. It is also contemplated within the scope of the present invention that the copolymer can be coated on other substrate materials. In this instance, the graft copolymers of the present invention are particularly useful, since they contain both hydrophilic and hydrophobic groups. One or the other of these groups or both can be compatible with the coated substrate.

As it was pointed out in co-pending application U.S. Ser. No. 282,099, the disclosure of which is incorporated herein by reference, the copolymerizable or reactive end group of the hydrophobic macromolecular monomer which is copolymerized with the second monomer is particularly selected based on the relative reactivity ratios of the second comonomer chosen to form the hydrophilic polymer backbone. Thus, the present invention provides a means for controlling the structure of the graft copolymer. More specifically, the control of the structure of the graft copolymer can be accomplished by any one or all of the following means:

1. by determining the reactivity ratio of the copolymerizable hydrophobic macromolecular monomer and the second monomer during the copolymerization reaction, a pure graft copolymer free from contamination by homopolymers can be prepared;
2. by controlling the monomer addition rates during the copolymerization of the copolymerizable hydrophobic macromolecular monomer and the second comonomer, the distance between the sidechains in the polymer structure can be controlled; and
3. the size of the graft chain can be predetermined and controlled in the anionic polymerization step of the preparation of the copolymerizable hydrophobic macromolecular monomer.

It will be apparent to those skilled in the art that by the proper selection of terminating agents, all mechanisms of copolymerization may be employed in preparing the controlled phase separated graft copolymers.

Of fundamental importance is the fact that the placement of the sidechain in the polymeric backbone is dependent on the terminal group of the macromolecular monomer and the second copolymerizable comonomer. Thus, the distribution of the sidechain polymer along the backbone polymer is controlled by the reactivity ratios of the respective comonomers.

As indicated hereinabove, the copolymerizable hydrophobic macromolecular monomers of the invention copolymerize with the comonomers which form the hydrophilic polymeric backbone in a predictable manner, as determined by relative reactivity ratios. It can be shown that the instantaneous copolymer equation:

$$\frac{dM_1}{dM_2} = \left[\frac{M_1}{M_2}\right] \times \left[\frac{r_1 M_1/M_2 + 1}{\frac{M_1}{M_2} + r_2}\right] \quad (1)$$

simply reduces to the approximation:

$$\frac{dM_1}{dM_2} \sim \frac{M_1}{r_2 M_2} \quad (2)$$

when $M_1$ is in very low molecular concentrations. Thus, the macromolecular monomer ($M_1$) copolymerizations with other monomers ($M_2$) are described only by $r_2$ values and monomer feed compositions. Rearrangement of equation (2) gives:

$$r_2 = \frac{dM_2/M_2}{dM_1/M_1} = \frac{\% \text{ Conversion } M_2}{\% \text{ Conversion } M_1} \quad (3)$$

The reactivity ratio, $r_2$ can be estimated from a relatively low conversion sample of a single copolymerization experiment. The validity of this concept of a predictable and controllable reactivity of the copolymerizable hydrophobic macromolecular monomer can thereby be established. It has been shown that the reactivity of commercial monomers with the copolymerizable hydrophobic macromolecular monomers of the present invention with various end groups correlates with available literature values for reactivity ratios of $r_2$.

Following the procedures outlined above, graft copolymers having unique combinations of properties are produced. These unique combinations of properties are made possible by the novel process herein which forces the compatibility of otherwise incompatible polymeric segments. These incompatible segments segregate into phases of their own kind. Thus, in the case of the instant graft copolymers having a hydrophilic polymeric backbone and a hydrophobic polymeric sidechain, separate phases of the respective polymers are formed. The product morphology is comprised of a hydrophobic domain which is dispersed in a hydrophilic polymeric matrix. The hydrophobic domains are interconnected by water-soluble chain segments. The hydrophobic domains act as cross-links and provide the wet strength to the water-swollen polymeric backbone. The degree of swelling in water may be controlled by the amount and molecular weight of the copolymerized hydrophobic macromolecular monomer and by the composition of the water-soluble or hydrophilic polymeric backbone. One type of example includes a composition wherein the hydrophilic backbone is comprised of a 5/95 acrylic acid/ethyl acrylate to 100/0 acrylic acid/ethyl acrylate, and a methacrylate terminated polystyrene having a molecular weight in the range of from about 10,000 to about 35,000 and a weight range of 20% to about 80% of the total product. This product can be swelled with water to provide a useful hydrogel.

Since the graft copolymers consist of hydrophobic and hydrophilic segments, they are particularly useful as protective colloids or suspension stabilizers for pigments, polymer suspensions, emulsions, etc. They are also useful in protective coatings and paints, where paint rheology may be controlled, or in adhesives where the hydrophobic polymeric sidechains would serve a dual role of stabilizer and adhesion promoter.

The novel graft copolymers of the invention are also useful as flocculants, especially when the hydrophilic polymeric backbone contains some cationic monomer functional group. These types of backbone polymeric materials also are useful as wet end additives. The copolymers may also be used as thickeners or defoamers. The dual nature of the novel copolymers of the present invention also makes them useful as wetting and coupling agents to hydrophilic surfaces in adhesive and bonding applications.

The high wet strength of the novel copolymers of the invention renders the polymeric compositions of the invention useful as water permeable membranes, sponges, hydrogels, ion exchange resins, conductive polymers, etc. Moisture permeability and moisture absorbability compositions may also be prepared by incorporating the copolymers of the present invention into films, etc. When the copolymerizable hydrophobic macromolecular monomer is employed in lower concentrations, the products have anti-static properties, especially if cationic functional moieties are contained in the hydrophilic polymeric backbone. The copolymers of the present invention are also useful when deposited on packaging film for anti-static properties and to give a fog-free hydrophilic surface.

These graft copolymers which contain both the hydrophilic and hydrophobic polymeric chains in a single molecule, have an enhanced effect on thickening over conventional industrial thickeners.

The solution properties of the graft copolymers of the present invention differ from random copolymers. While in the case of a random copolymer solution properties can be handled as if they were a new polymer composed of a single monomer unit, the graft copolymers of the present invention contain elements of the properties of the composing homopolymer chains. As soon as the interaction between the two dissimilar polymer chains becomes predominant, incompatibility and phase separation become the rule.

For example, when a graft copolymer consisting of the water-soluble and water-insoluble component chains is added to compounded latex, the interaction between polymeric thickener and latex particles, or pigments, clays, takes place and the polymeric thickener molecules collapse. Since two homopolymeric chains are incompatible, the hydrophobic chains gather together to form a microgel particle. The flocculation proceeds quickly to form large aggregates and, finally, the network is formed where all particles are bonded together by latex thickener molecules where microgel particles of the hydrophobic portion of the thickener molecules act as cross-linking points. In application of polymeric materials as industrial thickeners, flocculants, etc., the most effective structures are block or graft copolymers containing two incompatible homopolymer chains, that is, one is hydrophilic and the other is hydrophobic. The hydophilic portion of the molecule solubilizes the hydrophobic portion to make the whole molecule water- (or alkali-) soluble. However, when the thickener is added to compounded latex, the interaction between thickener and latex particles, clay, pigments takes place and the graft copolymer reduces its water-solubility. The hydrophobic portion of the molecule becomes water-insoluble, and aggregates to form a microgel, since it is incompatible with another portion of the molecule.

The novel graft copolymers of the present invention are also adapted as being a carrier for medicinally active substances and for natural and synthetic flavors, essences, fragrances, spices, food colors, sweeteners, dyes, and the like. Thus, various additives can be incorporated into the graft copolymers of the present invention in the manner disclosed in U.S. Pat. No. 3,520,949 to Thomas H. Sheppard et al, the disclosure of which is incorporated herein by reference.

The invention is illustrated further by the following examples which, however, are not to be taken as limiting in any respect. In each case, all materials should be pure and care should be taken to keep the reacted mixtures dry and free of contaminants. All parts and percentages, unless expressly stated to be otherwise, are by weight.

EXAMPLE 1

Preparation of Polystyrene Terminated with Allyl Chloride

A stainless steel reactor is charged with 76.56 parts of A.C.S. grade benzene (thiophene-free), which had been pre-dried by Linde molecular sieves and calcium hydride. The reactor is heated to 40° C and 0.015 part of diphenylethylene is added to the reactor by means of a hypodermic syringe. A 12.1% solution of sec-butyl lithium in hexane is added to the reactor portionwise until the retention of a permanent orange-yellow color, at which point an additional 0.885 parts (1.67 moles) of sec-butyl lithium solution is added, followed by the addition of 22.7 parts (218 moles) of styrene over a period of 44 minutes. The reactor temperature is maintained at 36°-42° C. The living polystyrene is terminated by the addition of 0.127 parts of allyl chloride to the reaction mixture. The resulting polymer is precipitated by the addition of the alpha-olefin terminated polystyrenebenzene solution into methanol, whereupon the polymer precipitates out of solution. The alpha-olefin terminated polystyrene is dried in an air circulating atmosphere drier at 40°-45° C and then in a fluidized bed to remove the trace amounts of methanol. The methanol content after purification is 10 parts per million. The molecular weight of the polymer, as determined by membrane phase osmometry, is 15,400 (theory: 13,000) and the molecular weight distribution is very narrow, i.e., the $\overline{M}w/\overline{M}n$ is less than 1.05. The macromolecular monomer has the following structural formula:

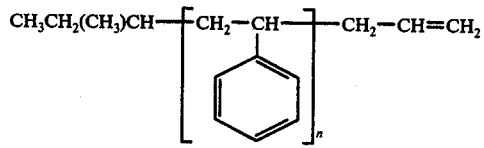

wherein n has a value such that the molecular weight of the polymer is 15,400.

EXAMPLE 2

Preparation of Poly(alpha-methylstyrene) Terminated with Allyl Chloride

A solution of 472 grams (4.0 moles) of alpha-methylstyrene in 2500 m). of tetrahydrofuran is treated dropwise with a 12% solution of n-butyl lithium in hexane until the persistence of a light red color. An additional 30 ml. (0.383 mole) of this n-butyl lithium solution is added, resulting in the development of a bright red color. The temperature of the mixture is then lowered to −80° C, and after 30 minutes at this temperature, 4.5 grams (0.06 mole) of allyl chloride is added. The red color disappears almost immediately, indicating termination of the living polymer. The resulting colorless solution is poured into methanol to precipitate the alpha-olefin terminated poly(alphamethylstyrene) which is shown by vapor phase osmometry to have a number average molecular weight of 11,000 (theory: 12,300) and the molecular weight distribution is very narrow, i.e., the $\overline{M}w/\overline{M}n$ is less than 1.05. The macromolecular monomer produced has the following structural formula:

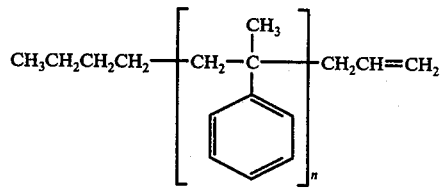

wherein n has a value such that the molecular weight of the polymer is 11,000.

EXAMPLE 3

Preparation of Polystyrene Terminated with Vinyl Chloroacetate

A solution of one drop of diphenyl ethylene in 2500 ml. of cyclohexane at 40° C is treated portionwise with a 12% solution of sec-butyl lithium in cyclohexane until the persistence of a light red color, at which point an additional 18 ml. (0.024 mole) of the sec-butyl lithium is added, followed by 312 grams (3.0 moles) of styrene. The temperature of the polymerization mixture is maintained at 40° C for 30 minutes, whereupon the living polystyrene is capped by treatment with 8 ml. (0.040 mole) of diphenyl ethylene, then terminated by treatment with 6 ml. (0.05 mole) of vinyl chloroacetate. The resulting polymer is precipitated by addition of the cyclohexane solution to methanol and the polymer is separated by filtration. Its number average molecular weight, as determined by vapor phase osmometry, is 12,000 (theory: 13,265), and the molecular weight distribution is very narrow, i.e., the $\overline{M}w/\overline{M}n$ is less than 1.06. The macromolecular monomer produced has the following structural formula:

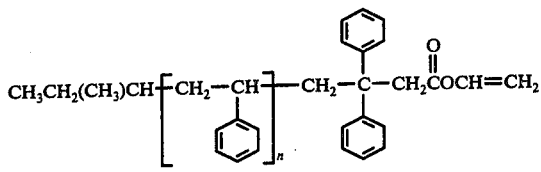

wherein n has a value such that the molecular weight of the polymer is 12,000.

EXAMPLE 4
Preparation of Poly(alpha-methylstyrene) Terminated with Vinyl Chloroacetate A solution of 357 grams (3.0 moles) of alpha-methylstyrene in 2500 ml. of tetrahydrofuran is treated dropwise with a 12% solution of t-butyl lithium in pentane until the persistence of a light red color. Thereupon, an additional 15.0 ml. (0.03 mole) of the t-butyl lithium solution is added, resulting in the development of a bright red color. The temperature of the mixture is then lowered to −80° C, and after 30 minutes at that temperature, 5.6 ml. if diphenyl ethylene is added. The resulting mixture is poured into 5.0 ml. (0.04 mole) of vinyl chloroacetate and the thus-terminated poly(alpha-methylstyrene) is precipitated with methanol and separated by filtration. Its number average molecular weight, as determined by vapor phase osmometry, is 14,280 (theory: 12,065) and the molecular weight distribution is very narrow. The macromolecular monomer produced has the following structural formula:

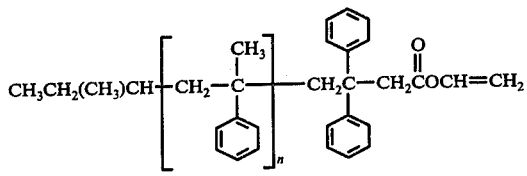

wherein n has a value such that the molecular weight of the polymer is 14,280.

EXAMPLE 5
Preparation of Polystyrene Terminated With Vinyl-2-Chloroethyl Ether A solution of one drop of diphenyl ethylene at 40° C is treated portionwise with a 12% solution of t-butyl lithium in pentane until the persistence of a light red color, at which point an additional 30 ml. (0.04 mole) of the t-butyl lithium solution is added, followed by 312 grams (3.0 moles) of styrene. The temperature of the polymerization mixture is maintained at 40° C for 30 minutes, whereupon the living polystyrene is terminated by treatment with 8 ml. (0.08 mole) of vinyl-2-chloroethyl ether. The resulting polymer is precipitated by addition of the benzene solution to methanol and the polymer is separated by filtration. Its number average molecular weight, as determined by vapor phase osmometry, is 7,200 (theory: 7,870) and the molecular weight distribution is very narrow, i.e., the $\overline{M}w/\overline{M}n$ is less than 1.06. The macromolecular monomer produced has the following structural formula:

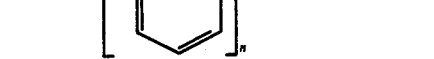

wherein n has a value such that the molecular weight of the polymer is 7,200.

EXAMPLE 6
Preparation of Polystyrene Terminated with Epichlorohydrin

A benzene solution of living polystyrene is prepared in Example 5 and terminated by treatment with 10 grams (0.10 mole) of epichlorohydrin. The resulting terminated polystyrene is precipitated with methanol and separated by filtration. Its molecular weight, as shown by vapor phase osmometry, is 8,660 (theory: 7,757) and its number average molecular weight distribution is very narrow. The macromolecular monomer produced has the following structural formula:

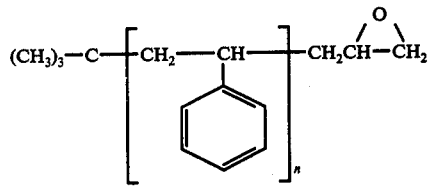

wherein n has a value such that the molecular weight of the polymer is 8,660.

EXAMPLE 7
Preparation of Polystyrene Terminated with Methacrylyl Chloride

To a solution of 0.2 ml. of diphenyl ethylene in 2500 ml. of benzene there is added dropwise a 12% solution of n-butyl lithium in hexane until the persistence of a light reddish-brown color. An additional 24 ml. (0.031 mole) of this n-butyl lithium solution is added, and then, 416 grams (4.0 moles) of styrene, resulting in the development of an orange color. A temperature of 40° C is maintained throughout by external cooling and by controlling the rate at which the styrene is added. This temperature is maintained for an additional 30 minutes after all of the styrene has been added, and then is lowered to 20° C, whereupon 4.4 grams (0.1 mole) of ethylene oxide and is added, causing the solution to become colorless. The living polymer is terminated by reaction with 10 ml. (0.1 mole) of methacrylyl chloride. The resulting polymer has a number average molecular weight as shown by vapor phase osmometry of 10,000. The macromolecular monomer has the following structural formula:

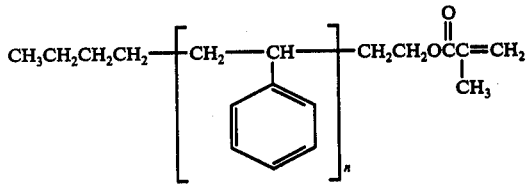

wherein n has a value such that the molecular weight of the polymer is 10,000.

EXAMPLE 8

Preparation of Polystyrene Terminated with Methacrylyl Chloride

A stainless steel reactor is charged with 32 gallons of A.C.S. grade benzene (thiophene-free), which had been pre-dried by Linde molecular sieves and calcium hydride. The reactor is heated to a temperature of between 38°–40° C and 10 ml. of diphenyl ethylene is added to the reactor by means of a hypodermic syringe. An 11.4% solution of sec-butyl lithium in hexane is added to the reactor portionwise until the retention of a permanent orange-yellow color is obtained (60 ml.) at which point an additional 3.44 pounds of the sec-butyl lithium in hexane is added to the reactor, followed by the addition of 82.5 pounds of purified styrene over a period of 1 hour and 40 minutes. The reactor temperature is maintained at 38°–40° C. The living polystyrene is capped by the addition of 0.28 pound of ethylene oxide and the reaction solution changes from a red-orange color to yellow. The resulting capped living polystyrene is thereafter reacted with 260 ml. of methacrylyl chloride and the solution changes to a very pale yellow color. The methacrylate terminated polystyrene is precipitated by the addition of the polymer benzene solution into methanol, whereupon the polymer precipitates out of solution. The polymer is dried in an air circulating atmosphere drier at 40°–45° C and then in a fluidized bed to remove the trace amounts of methanol. The molecular weight of the polymer, as determined by membrane phase osmometry, is 13,400 and the molecular weight distribution is very narrow, i.e., the $\overline{M}w/\overline{M}n$ is less than 1.05.

EXAMPLE 9

Preparation of Polystyrene Terminated with Maleic Anhydride

A stainless steel reactor is charged with 2.5 liters of A.C.S. grade benzene (thiophene-free), which had been pre-dried by Linde molecular sieves and calcium hydride. The reactor is heated to 40° C and 0.2 ml. of diphenyl ethylene is added to the reactor by means of a hypodermic syringe. A 12.1% solution of sec-butyl lithium in hexane is added to the reactor portionwise until the retention of a permanent orange-yellow color is obtained (0.7 ml.), at which point an additional 22.3 ml. of sec-butyl lithium solution is added, followed by the addition of 421.7 grams of styrene over a period of 16 minutes. The reactor temperature is maintained at 40°–45° C. Five minutes after styrene addition is completed, ethylene oxide is added from a lecture bottle sub-surface intermittently until the solution is water-white. One hour after ethylene oxide addition is complete, 20.55 ml. of maleic anhydride-benzene solution (the maleic anhydride solution was prepared by dissolving 84 grams of maleic anhydride in 550 grams of purified benzene) is added to the capped living polymer. One hour after the addition of the maleic anhydride solution, the contents of the reactor are discharged and precipitated in methanol. The maleic half ester terminated polystyrene had a molecular weight of about 14,000, as determined by Gel permeation Chromatography. The polymerizable macromolecular monomer has a structural formula represented as follows:

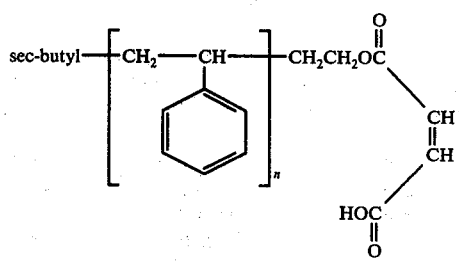

EXAMPLE 10

Preparation of Polybutadiene Terminated with Allyl Chloride

C.P. grade 1,3-butadiene (99.0% purity) is condensed and collected in 1-pint soda bottles. These bottles had been oven-baked for 4 hours at 150° C, nitrogen purged during cooling, and capped with a perforated metal crown cap using butyl rubber and polyethylene film liners. These bottles containing the butadiene are stored at −10° C with a nitrogen pressure head (10 psi) in a laboratory freezer before use. Hexane solvent is charged to the reactors and heated to 50° C, followed by the addition of 0.2 ml. of diphenyl ethylene by way of a syringe. Sec-butyl lithium is added dropwise via syringe to the reactor until the red diphenyl ethylene anion color persists for at least 10–15 minutes. The reactor temperature is lowered to 0° C, and 328.0 grams of butadiene are charged into the polymerization reactor, followed by the addition of 17.4 ml. (0.02187 mole) of a 12% sec-butyl lithium solution in hexane, when half of the butadiene charge has been added to the reactor. The butadiene is polymerized for 18 hours in hexane at 50° C. Following the polymerization, 400 ml. portions of the anionic polybutadiene solution in the reactor is transferred under nitrogen pressure into capped bottles. Allyl chloride (0.48 ml., 0.00588 mole) is injected into each of the bottles. The bottles are clamped in water baths at temperatures of 50° C and 70° C for periods of time ranging up to 24 hours. The samples in each of the bottles are short-stopped with methanol and Ionol solution and analyzed by Gel Permeation Chromatography. Each of the samples is water-white and the analysis of the Gel Permeation Chromatography scans reveals that each of the samples had a narrow molecular weight distribution.

Several comparison samples were conducted in bottles coming from the same lot of living polybutadiene, which were capped with 2-chlorobutane (0.4 ml., 0.00376 mole) as the terminating agent. The resulting polymers terminated with 2-chlorobutane were yellow in color and, after standing for a period of 24 hours at 70° C, appeared to have a broad molecular weight distribution as revealed by the Gel Permeation Chromatography scan. It is clear that the reaction and reaction product of 2-chlorobutane with anionic polybutadiene are different than the reaction and reaction product of allyl chloride and anionic polybutadiene.

EXAMPLE 11

Preparation of Methacrylate Terminated Polyisoprene

A one-gallon Chemo glass-bowl reactor is charged with 2.5 liters of purified heptane which had been pre-dried by Linde molecular sieves and calcium hydride, followed by the addition of 0.2 ml. of diphenyl ethylene as an indicator and the reactor is sterilized with the dropwise addition of tertiary butyl lithium solution (12% in hexane) until the retention of the characteristic light yellow color is obtained. The reactor is heated to 40° C and 19.9 ml. (0.025 mole) of a 12% solution of tertiary butyl lithium in hexane is injected into the reactor via hypodermic syringe, followed by the addition of 331.4 grams (4.86 moles) of isoprene. The mixture is allowed to stand for one hour at 40° C and 0.13 mole of ethylene oxide is charged into the reactor to cap the living polyisoprene. The capped living polyisoprene is held at 40° C for 40 minutes, whereupon 0.041 mole of methacrylyl chloride is charged into the reactor to terminate the capped living polymer. The mixture is held for 13 minutes at 40° C, followed by removal of the heptane solvent by vacuum stripping. Based upon the Gel Permeation Chromatography scans for polystyrene, the molecular weight of the methacrylate terminated polyisoprene by Gel Permeation Chromatography was about 10,000 (theory: 13,000). The methacrylate terminated polyisoprene macromolecular monomer has a structural formula represented as follows:

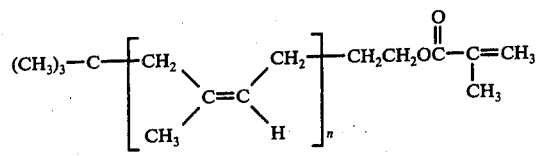

EXAMPLE 12

Preparation of Alpha-Olefin Terminated Polyisoprene

A one-gallon Chemco glass-bowl reactor is charged with 2.5 liters of purified heptane which had been pre-dried by Linde molecular sieves and calcium hydride, followed by the addition of 0.2 ml. of diphenyl ethylene as an indicator. The reactor and solvent are sterilized by the dropwise addition of tertiary butyl lithium solution (12% in hexane) until the retention of the characteristic light yellow color is obtained. The reactor is heated to 40° C and 19.03 ml. (0.02426 mole) of tertiary butyl lithium solution is injected into the reactor via hypodermic syringe, followed by the addition of 315.5 grams (4.63 moles) of isoprene. The polymerization is permitted to proceed at 50° C for 66 minutes and at this time, 2.0 ml. (0.02451 mole) of allyl chloride is added to the living polyisoprene. The terminated polyisoprene is held at 50° C for 38 minutes, whereupon the polymer is removed from the reactor to be used in copolymerization reactions. The polymer was analyzed by Gel Permeation Chromatography and had a very narrow molecular weight distribution, i.e., an Mw/Mn of less than about 1.06. The theoretical molecular weight of the polymer is 13,000. The polymerizable macromolecular monomer has a structural formula represented as follows:

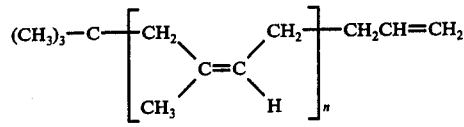

EXAMPLE 13

Preparation of Polystyrene Macromolecular Monomer, Capped with Butadiene and Terminated with Allyl Chloride 2.5 liters of benzene (thiophene-free) are charged into the reactor and heated to 40° C. 0.2 ml. of diphenyl ethylene is added as an indicator and the reactor is sterilized with dropwise addition of a 12% solution of sec-butyl lithium until the persistence of an orange-red color. At this point, an additional 18 ml. (0.024 mole) of sec-butyl lithium solution (12% in hexane) is added, followed by 416 grams (4.0 moles) of styrene. The temperature of the polymerization mixture is maintained at 40° C for 5 minutes. Then the living polystyrene is capped with butadiene by bubbling butadiene gas into the reactor until the color of the solution changes from dark red to orange. The living polymer is terminated by treatment with 4.1 ml. (0.05 mole) of allyl chloride. The macromolecular monomer thus prepared is precipitated with methanol and separated by filtration. Its number average molecular weight estimated from Gel Permeation Chromatograhy is 25,000 (theory: 18,000) and molecular weight distribution is very narrow. The macromolecular monomer produced has the following structural formula:

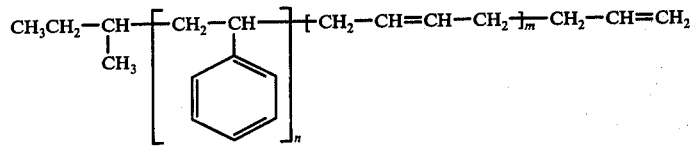

where m equals 1 or 2.

EXAMPLE 14

Preparation of a Graft Copolymer Having Polyacrylic Acid Hydrophilic Polymeric Backbone and Polystyrene Hydrophobic Polymeric Sidechains 60 grams of a polystyrene terminated with vinyl-2-chloroethyl ether as prepared in Example 5 hereinabove and having a molecular weight of about 8,000 and a very narrow molecular weight distribution such that the ratio of $\overline{M}w/\overline{M}n$ is less than about 1.06 was dissolved in 240 grams of acrylic acid and 50 grams of tetrahydrofuran (THF) in a 2-liter resin flask. 500 grams of additional THF were placed in the 2-liter resin flask and 0.6 gram of benzoyl peroxide was then added. The flask was heated to 65° C and the polymerization was allowed to proceed for 2 hours. After the polymerization, 300 grams of distilled water was added to the resin flask and the THF distilled off. The aqueous copolymer system was then used as a latex thickener.

EXAMPLE 15

Preparation of a Graft Copolymer Having Polyacrylic Acid Hydrophilic Polymeric Backbone and Polystyrene Hydrophobic Polymeric Sidechains 4 grams of Triton X-100 was dissolved in 500 grams of distilled water and placed in a Waring blender. 30 grams of tertiary butyl polystyrene vinyl ether as prepared in Example 5 hereinabove was dissolved in 60 grams of benzene, and the solution was added to the Waring blender containing the Triton X-100 solution, under high shear, to make a stable dispersion. The dispersion was charged in a 2-liter resin flask, equipped with a stirrer, condenser, and purged with nitrogen for 1 hour. The kettle was heated up to 65° C, and 240 grams of acrylic acid was added (pH was neutralized to 8.0 with ammonium hydroxide). One gram of benzoyl peroxide was added to the resin flask and polymerization was carried out at 69° C for 3 hours. The polymer was recovered as in Example 14 for further evaluation and testing as an industrial latex thickener.

EXAMPLE 16

Preparation of a Graft Copolymer Having Polyacrylic Acid Hydrophilic Polymeric Backbone and Polystyrene Hydrophobic Polymeric Sidechains 18 grams of Triton X-405 (or 26 grams of 70% solid Triton X-405) was dissolved in 300 grams of water, and the pH was adjusted to 8 with ammonium hydroxide and placed in a Waring blender. 30 grams of the tertiary butyl polystyrene vinyl ether as prepared in Example 5 was dissolved in 70 grams of ethylacrylate, and the solution was added to the Waring blender containing Triton X-405 solution, under high shear, to make a stable dispersion. The dispersion was charged in a 2-liter resin flask, equipped with a stirrer, condenser, and purged with nitrogen for 1 hour. The kettle was heated to 65° C, and 0.1 gram of ammonium persulfate was added. 200 grams of ethylacrylate and 2% ammonium persulfate solution were added to the polymerization kettle over a 3-hour period and the polymerization was carried out at 65° C to 67° C. The polymeric backbone was rendered hydrophilic by hydrolyzing the acrylic ester groups with alkali under heat. The resulting hydrophilic-hydrophobic polymer was recovered in the manner described in the previous examples.

EXAMPLE 17

Latex Thickening of Polyacrylic Acid Hydrophilic-Polystyrene Polymeric Sidechains Three graft copolymers composed of 80% polyacrylic acid polymeric backbones and 20% polymeric polystyrene sidechains, as prepared in the previous examples, were tested as a latex thickener. The sizes of the polystyrene sidechain were as follows: Sample A(G30), $\overline{M}n$ equals 1,000; Sample B(G32), $\overline{M}n$ equals 4,000; and Sample C(G33), $\overline{M}n$ equals 8,000. The graft copolymers were tested in the following manner. To 300 grams, samples of Wica Latex 7035 (50% solids), 0.3 gram, 0.6 gram and 1.2 grams of the hydrophilic graft copolymer (solids basis) were added, and viscosity was measured by a Brookfield LVT Viscometer (No. 3 spindle, 12 rpm). The results of this test were as follows:

TABLE 1

| Amount Of Copolymer Added | Brookfield Viscosity (Centipoise) | | |
|---|---|---|---|
| | Sample A(G30) | Sample B(G32) | Sample C(G33) |
| None | 1400 | 1430 | 1410 |
| 0.3 gram | 3100 | 3380 | 3550 |
| 0.6 gram | 4200 | 4900 | 5600 |
| 1.2 grams | 6500 | 7000 | 7500 |

As it can be seen from the above data, the graft copolymers of the present invention act as excellent thickeners for latexes due to the presence of both the hydrophilic and hydrophobic polymeric segments. It was apparent that the polymeric sidechains having a uniform molecular weight distribution contributed to the overall capacity to form a stable latex. It is also apparent that the higher molecular weight polymeric sidechains improve the overall thickening capacity. This is due to the fact that the polymeric sidechains at the higher molecular weight, i.e., above about 2,000, resemble the properties of a polystyrene polymer and a better phase separation occurs when the polymeric sidechains have a higher molecular weight.

EXAMPLE 18

Preparation of Polyvinyl Alcohol Hydrophilic Polymeric Backbone Graft Copolymers Having Polystyrene Hydrophobic Polymeric Sidechains 60 grams of the purified copolymerizable hydrophobic macromolecular monomer having a vinyl ether end group, as prepared by the procedure of Example 5 (the macromolecular monomer was prepared in the same manner, except that sec-butyl lithium was used as the initiator and the polymer had a molecular weight of 2,080 and an $\overline{M}w/\overline{M}n$ ratio of less than about 1.1), was copolymerized with 240 grams of vinyl acetate in benzene using benzoyl peroxide as a catalyst. The polyvinyl acetatestyrene graft copolymer (G26) thus-prepared was hydrolyzed to polyvinyl alcohol-styrene graft copolymer in a 50/50 methanol/benzene mixture using sodium methoxide as a catalyst. The resultant polymer was washed with methanol, vacuum dried and thereafter extracted with benzene. Analysis of the extracted copolymer revealed that a copolymer was formed. The saponified product was cast as a film to ascertain its water-resistance compared to commercially available polyvinyl alcohol. The films were each coated on glass and soaked in water at room temperature overnight. By simple visual observation, it was clearly apparent that the waterresistance of the copolymers of the present invention was highly improved over that of the polyvinyl alcohol control.

EXAMPLE 19

Preparation of Polyvinyl Alcohol Hydrophilic Polymeric Backbone Graft Copolymers Having Polystyrene Hydrophobic Polymeric Sidechains A latex copolymerization reaction was conducted by adding 0.4 gram of sodium dodecyl sulfate to 85 grams of water under agitation. 15 grams of the methacrylate terminated polystyrene prepared as in Example 8 was added thereto, followed by the addition of 30 grams of vinyl acetate. 0.15 gram of benzoyl peroxide was added and the polymerization was conducted for 6 hours at 40°–50° C. Following polymerization, the copolymer was stirred in 100 ml. of methanol and 10 grams of sodium methoxide was added to the solution over a 20 minute period. The solution was refluxed for 10 minutes and the polymer was washed twice with isopropanol and dried at 70° C under vacuum. The solubility of the hydrolyzed product was examined using a variety of solvents. The copolymer was slightly soluble in DMSO, but insoluble in toluene, tetrahydrofuran, benzene, and cresol. Films prepared from the copolymer were transparent and exhibited good elongation and excellent wet strength.

EXAMPLE 20

Preparation of Polyhydroxyethyl Methacrylate Hydrophilic Polymeric Backbone Graft Copolymers Having Polystyrene Hydrophobic Polymeric Sidechains 75 parts of a methacrylate terminated polystyrene as prepared in Example 7 having a uniform or narrow molecular weight distribution was admixed with 125 parts of hydroxyethyl methacrylate and the polymerization was initiated with 0.4 part of tertiary butyl peroctoate as the polymerization catalyst. The polymerization of the material was effected by initially heating the mixture to about 50° C for 8 hours. The polymerization was then completed by heating for about 1 hour at 90° C and then heating for another hour at 120° C. After the polymerization was completed, a clear, firm, and rigid copolymer was obtained. The polymer was contacted with physiological saline solution until it was in a state of osmotic equilibrium with the physiological saline solution. The hydrogel film thus obtained was clear, flexible and elastic.

EXAMPLE 21

Preparation of a Graft Copolymer Having Poly(N,N-Dimethylacrylamide) Hydrophilic Polymeric Backbone and Polystyrene Hydrophobic Polymeric Sidechains 40 grams of the purified highly functional methacrylate terminated polystyrene as prepared in Example 8 (molecular weight of 13,400 and a $\overline{M}w/\overline{M}n$ ratio of less than 1.05) and 60 grams of N,N-dimethylacrylamide were dissolved in 150 grams of benzene. The mixture was mixed on a shaker to obtain a homogeneous solution. 0.12 gram of AIBN (VAZO) polymerization initiator was added and the contents were transferred to a one quart polymerization bottle. The contents were flushed with nitrogen and sealed, followed by additional nitrogen purging. The polymerization bottle was placed on a shaker in a water bath at 60° C for 19.5 hours, followed by a finishing polymerization temperature of 85° C for 2 hours. The resulting copolymer was a clear, very viscous liquid. 250 grams of benzene was added to the viscous liquid copolymer to render it less viscous. The weight of the solvent and copolymer was 465 grams, of which 20.9% was solids (95.4 grams solids) to provide a 95.4% yield of copolymer.

Films of the copolymer were cast by drawing the benzenecopolymer solution on glass plates with a drawing bar. The films were optically clear. The coated plates were immersed in distilled water and the resulting wet films were tough and remained clear. The swelling ratio of the films was 2.2 grams of water per gram of copolymer. The wet films had a tensile strength of 870 psi and an elongation of 100%. The films were tested for water vapor transmission (WVT), employing ASTM Test Method E96-63T(B), and the WVT of the wet films was 1,100 g./24 hrs./m².

Gel Permeation Chromatography analysis of the copolymer revealed that there was no unreacted hydrophobic macromolecular monomer present. The fact that copolymer did not dissolve when immersed in water and the high strength of the wet films are indicative that the hydrophobic polymeric sidechains acted as physical cross-links to the normally water-soluble poly(N,N-dimethylacrylamide).

The above copolymer was inverted in water and evaluated for water vapor transmission properties. The wet copolymer film, when measured for WVT was 2,000 g./24 hrs./m², which illustrated its use as a semipermeable membrane.

EXAMPLE 22

Preparation of a Graft Copolymer Having Poly(N,N-Dimethylacrylamide)Hydrophilic Polymeric Backbone and Polystyrene Hydrophobic Polymeric Sidechains Ten parts of a methacrylate terminated polystyrene, as prepared by the procedure described in Example 8 (the methacrylate terminated polystyrene had a molecular weight of 12,100 and a $\overline{M}w/\overline{M}n$ ratio of less than about 1.06, as determined by Gel permeation Chromatography analysis) was dissolved in a mixture of 90 parts of N,N-dimethylacrylamide and 900 parts of benzene. The mixture was placed on a shaker until a homogeneous solution was obtained. Thereafter, 0.1 part of AIBN was added and the solution was charged into a one quart polymerization bottle and purged with nitrogen and capped. Following a further purging of the capped system with nitrogen, the polymerization mixture was placed on a shaker in a hot water bath at 67° C and the polymerization was allowed to continue for 12 hours. Following polymerization, the copolymer was recovered by precipitation in hexane, followed by filtration and drying. The copolymer was a clear, viscous solution possessing excellent wet strength properties when immersed in water.

EXAMPLE 23

Preparation of a Graft Copolymer Having Poly(N,N-Dimethylacrylamide) Hydrophilic Polymeric Backbone and Polystyrene Hydrophobic Polymeric Sidechains Ten parts of a methacrylate terminated polystyrene, as prepared in accordance with the procedure set forth in Example 8 (the methacrylate terminated polystyrene had a molecular weight of 12,700 and a $\overline{M}w/\overline{M}n$ ratio of less than about 0.05 as determined by Gel Permeation Chromatography analysis), was dissolved in 90 parts of N,N-dimethylacrylamide. Five parts of calcium stearate was dispersed in the comonomeric mixture and 200 parts of heptane and 0.1 part of AIBN were added to the comonomeric mixture under rapid agitation. The system was charged to a one quart polymerization bottle, purged with nitrogen and capped. The capped system was given another purging with nitrogen to clean the system. The polymerization was conducted by placing the polymerization bottle on a shaker in a hot water bath at 67° C and polymerization was allowed to continue for 12 hours. The copolymer was obtained in the form of a fine powder and was easily filtered and dried. The recovery of the copolymer was extremely successful due to the use of the non-aqueous emulsion polymerization technique. Analysis of the product by Gel Permeation Chromatography revealed that there was no unreacted methacrylate terminated polystyrene present. The copolymer possessed excellent wet strength when soaked in water. The copolymer was also useful in preparing a polyblend with polyvinyl chloride. In this manner, various polyblends were prepared by dry blending 40–60 parts by weight of the copolymer with 60–40 parts by weight of polyvinyl chloride. The dry blends were subjected to shear on a mill at elevated temperatures to obtain films having excellent water vapor transmission properties. For a further description of blending polymers of N,N-dialkylacrylamides with polyvinyl chloride resins, reference is made to co-pending application Ser. No. 359,284, now U.S. Pat. No. 3,792,009, granted Feb. 12, 1974, the disclosure of which is incorporated herein by reference.

As a specific example of a polyblend, 33.3 parts of the copolymer described above was dry blended with 70 parts of polyvinyl chloride (Vygen 110) and 70 parts of dioctyl phthalate (DOP). The dry blended mixture was placed on a rubber mill at 300° F for 8 minutes. The blended components fluxed very readily and formed a smooth, clear, transparent film. After blending and subjecting the mixture to high shear, a 10-mil film was evaluated for water vapor transmission and water absorption properties. The polyblend had a water vapor transmission of 200 g./24 hrs./m² and absorbed 5.8% moisture in 18 hours at 85% relative humidity. In comparison, a similar blend prepared with a homopolymer of N,N-dimethylacrylamide with the plasticized polymer of vinyl chloride had a water vapor transmission rate of 75 g./24 hrs./m² and absorbed 4.5% moisture in 18 hours at 85% relative humidity. It was quite evident that in addition to the improved physical properties, that the hydrophobic polystyrene sidechains improved the processing of the polyblend and this was attributed to the solubility of the polystyrene sidechains in the dioctyl phthalate. In other words, the sidechains improved the melt rheology conferred on the poly(N,N-dimethylacrylamide) by these graft chains.

EXAMPLE 24

Preparation of a Graft Terpolymer of a Poly(N,N-Dimethylacrylamide)/Butyl Acrylate Hydrophilic Polymeric Backbone and Polystyrene Hydrophobic Polymeric Sidechains Ten parts of a methacrylate terminated macromolecular monomer, as prepared in Example 8 (the methacrylate terminated polystyrene had a molecular weight of 20,000 and a $\overline{Mw}/\overline{Mn}$ ratio of less than about 1.06, as determined by Gel Permeation Chromatography), was dissolved in 85 grams of N,N-dimethylacrylamide with the aid of an air mixer. Five parts of butyl acrylate, 5 parts of calcium stearate, and 0.1 part of AIBN and 200 parts of heptane were then added to the comonomeric mixture, stirred, transferred to a one quart polymerization bottle. The polymerization mixture was purged with nitrogen and capped. The polymerization was conducted by placing the reaction bottle on a shaker in a hot water bath at 67° C for 16 hours. The terpolymer was filtered and dried. The yield of terpolymer was 105 g. - 100% based on "solid material" added.

EXAMPLE 25

Preparation of a Graft Terpolymer of a Maleate Half Ester Hydrophilic Polymeric Backbone and Polystyrene Hydrophobic Polymeric Sidechains Initially, a maleate half ester of a methoxy polyethylene oxide ether of 750 molecular weight (Carbowax 750) was prepared by condensing maleic anhydride with Carbowax 750. Seven parts of the Carbowax 750 maleate half ester and 250 parts of isooctane (Soltrol 10, available from Phillips Petroleum Company) were charged in a reaction kettle. The temperature of the reaction kettle was raised to 73° C and a comonomeric mixture of 135 parts of N,N-dimethylacrylamide and 7.5 parts of a maleate half ester terminated polystyrene macromolecular monomer (The maleate half ester terminated polystyrene was prepared in accordance with the procedure set forth in Example 9. The polymer had a molecular weight of 7,000 and had a $\overline{Mw}/\overline{Mn}$ ratio of less than about 1.05, as determined by Gel Permeation Chromatography.) was added. To the reaction kettle containing the polymerizable monomers, there was added 20 parts of a 20% solution of a 53/47 N,N-dimethylacrylamide/lauryl methacrylate copolymer dispersion in isooctane and 0.3 part of AIBN as the polymerization initiator over a period of 5 hours, after which additional isooctane was added. After 12 additional hours of polymerization, a fine dispersion of the terpolymer was recovered by filtration. The terpolymer had excellent wet strength properties when immersed in water.

EXAMPLE 26

Preparation of a Graft Copolymer of Poly(Hydroxyethyl Methacrylate) Hydrophilic Polymeric Backbone and Polyisoprene Hydrophobic Polymeric Sidechains 50 parts (based on solids, dry basis) of the methacrylate terminated polyisoprene as prepared in Example 11 (the methacrylate terminated polyisoprene had a molecular weight of 10,000 and a $\overline{Mw}/\overline{Mn}$ ratio of less than 1.1, as determined by Gel Permeation Chromatography) in heptane was mixed with 100 parts of hydroxyethyl methacrylate in a one quart polymerization reactor. The comonomeric mixture was purged with nitrogen and copolymerized by the addition of 0.2 part of AIBN polymerization initiator at a temperature of 67° C over a period of 16 hours. The resulting copolymer was a clear, viscous solution. The clear copolymeric solution was placed in a mold and subjected to gamma radiation for 20 minutes. The copolymer was then soaked in physiological saline solution. The wet copolymer had excellent wet strength which was attributed to the fact that the hydrophilic backbone was held together by the hydrophobic sidechains which were joined together by the radiation cross-linking. The copolymer was thus reinforced by a cross-linked hydrophobic domain structure chemically bonded to the hydrophilic matrix phase.

The hydrophilic-hydrophobic graft copolymers of the present invention unexpectedly have improved physical properties (e.g., tensile strength, wet strength, elongation, etc.) when they are in their hydrated state. Generally, hydrophilic polymers must be cross-linked with a chemical cross-linking agent to achieve these improved physical properties. However, the novel graft copolymers of the present invention uniquely provide a thermally labile physical cross-link which serves to anchor the polymeric backbone segments and also provide a "fillereffect" and thus increase the modulus and tensile strength of the ultimate polymer. When the graft copolymer is heated to a temperature higher than the Tg of the polymeric sidechain (90°–100° C for polystyrene), the domains become fluid, and flow under pressure, thus they are truly thermoplastic. When the graft copolymer is cooled, the domains reform and the graft copolymer resumes the properties of a cross-linked hydrophilic polymer.

The addition of an aqueous liquid merely acts as a plasticizer for the hydrophilic polymer, without dissolving the entire copolymer material. The graft copolymers can be formed into hydrogels by immersing them in an aqueous liquid (water or physiological saline, etc.). The amount of aqueous liquid can vary over a wide range, depending on the composition of the graft copolymer, i.e., the amount of the polymeric sidechains in the graft copolymer. Generally, the amount of the aqueous liquid will range from about 10% to about 95%, by weight, of the graft copolymer, preferably 45% to 80%. Even when high levels of aqueous liquids are in the graft copolymers of the present invention, they are able to retain their shape, thus making them useful in preparing contact lenses, body implants and the like. The formation of the hydrogel by immersing the copolymer of the present invention in an aqueous liquid which collects in the copolymer in the form of minute drops which fill microscopic pores or cavities which are distributed throughout the matrix of the hydrogel and its mechanical retention is enhanced by the covalent forces of the hydrophilic polymer which are held together by the thermally labile cross-links of the hydrophobic polymeric sidechains. The water may be removed if desired from the graft copolymer by exerting pressure on the polymeric material. After the pressure is released, air cannot enter the cavities and the overall volume of the article remains smaller until it is placed in contact with water or an aqueous solution whereupon it swells back to its original size and shape. The water is held in such an article partly by capillary attraction in the cavities, and partly as a constituent of the colloidal system of the hydrogel. In such a manner as herein described, the hydrogels of the present invention have absorbant qualities which can be used to advantage in adherent pads or layers such as in medicinal bandages. The product can also be used as an ultrafiltration semi-permeable membrane film. In this latter connection, it may be desired to render the hydrophilic graft copolymer porous with the use of leaching agents or blowing agents incorporated within the polymeric structure during the course of polymerization or as a post treatment.

Another unique modification of the present invention involves preparing hydrophilic-hydrophobic graft copolymers as emulsions useful in paper coatings. These copolymers incorporate a polyvinyl aromatic (e.g., polystyrene) or polyvinyl aromatic/polybutadiene in a polyvinyl acetate polymeric backbone. The following reactions characterize this unique approach for preparing emulsion graft copolymers:

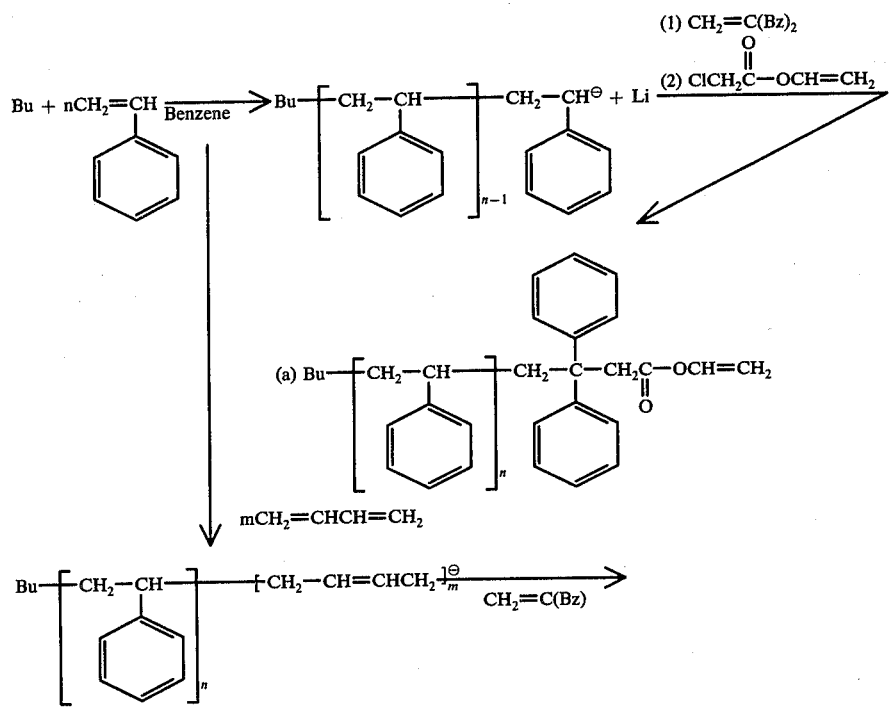

-continued

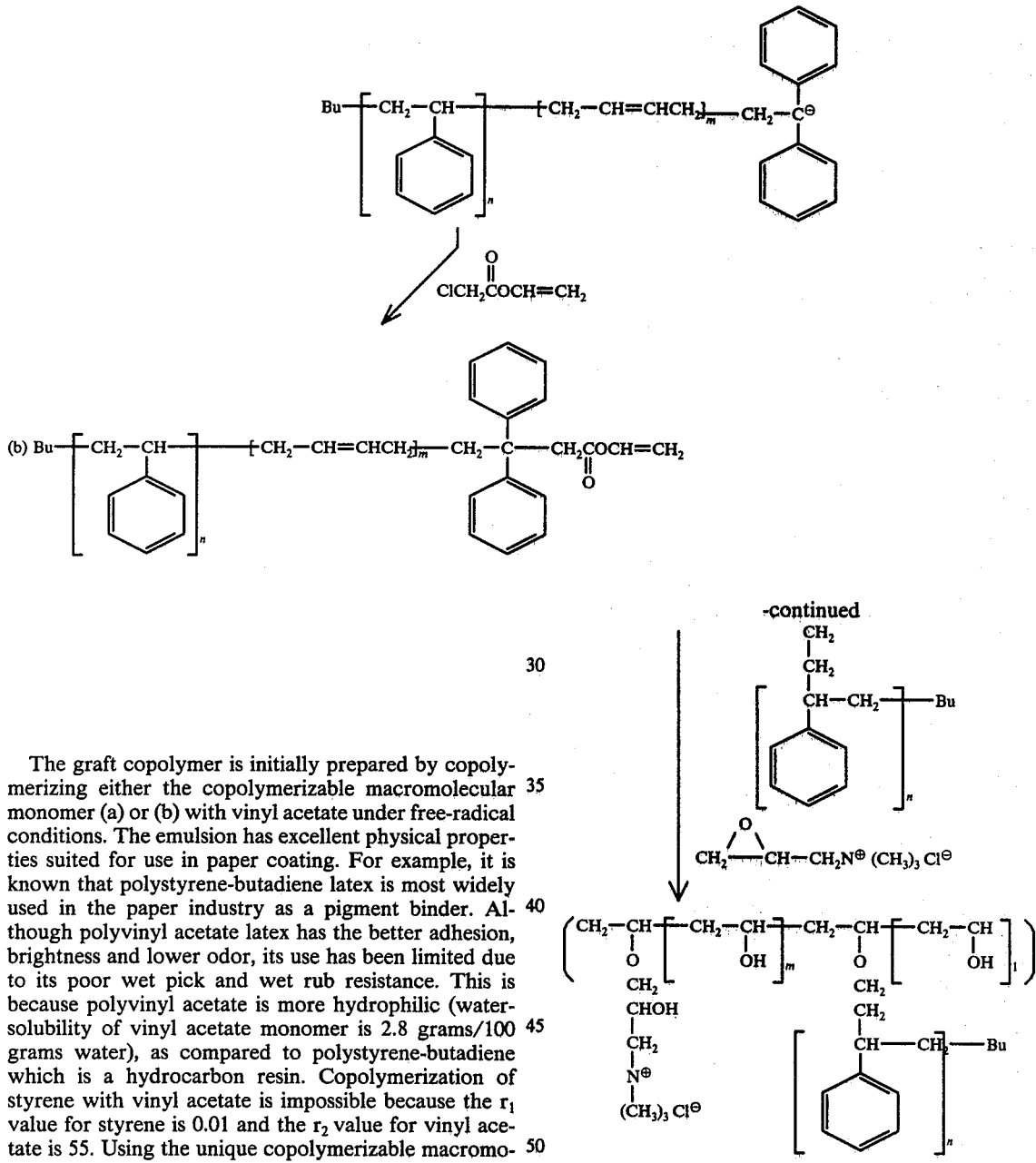

The graft copolymer is initially prepared by copolymerizing either the copolymerizable macromolecular monomer (a) or (b) with vinyl acetate under free-radical conditions. The emulsion has excellent physical properties suited for use in paper coating. For example, it is known that polystyrene-butadiene latex is most widely used in the paper industry as a pigment binder. Although polyvinyl acetate latex has the better adhesion, brightness and lower odor, its use has been limited due to its poor wet pick and wet rub resistance. This is because polyvinyl acetate is more hydrophilic (water-solubility of vinyl acetate monomer is 2.8 grams/100 grams water), as compared to polystyrene-butadiene which is a hydrocarbon resin. Copolymerization of styrene with vinyl acetate is impossible because the $r_1$ value for styrene is 0.01 and the $r_2$ value for vinyl acetate is 55. Using the unique copolymerizable macromolecular monomers of the present invention, the properties of polyvinyl acetate and polystyrene and polystyrene-butadiene can be combined to provide the excellent adhesion and brightness of polyvinyl acetate and the good wet pick and wet rub resistance of a polystyrene or polystyrenebutadiene latex.

Still another unique aspect of the present invention is to prepare wet end additives from graft copolymers. For example, the graft copolymer of Example 18 can be treated with a cationic reagent to thereby obtain a wet end additive useful in paper making. Such a process can be described by the following reaction scheme, starting with the product of Example 18:

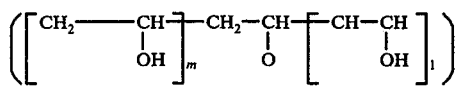

The above-described graft copolymer is unique inasmuch as the phase separation of the polyvinyl alcohol segment enhances both the wet and dry strength of the paper having incorporated therein the cationic graft copolymer.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. A chemically joined, phase separated self-cured hydrophilic thermoplastic graft copolymer of:
   1. at least one copolymerizable normally hydrophobic macromolecular monomer having a substantially uniform molecular weight distribution, and
   2. at least one hydrophilic (water-soluble) copolymerizable comonomer or compound rendered hydrophilic forming the polymeric backbone of said copolymer, said copolymerizable normally hydrophobic macromolecular monomer forming linear polymeric sidechains of said graft copolymer, wherein:
      a. the polymeric backbone of the graft copolymer is comprised of polymerized units of said copolymerizable comonomers, wherein the copolymerizable comonomers are selected from the group consisting of hydroxyalkyl and hydroxyalkoxyalkyl esters of acrylic and methacrylic acids, N-hydroxyalkyl and N,N-bis-hydroxyalkyl amides of acrylic and methacrylic acids, vinyl esters of monocarboxylic acids which are rendered hydrophilic by hydrolysis of said vinyl esters subsequent to copolymerization, N-vinyl pyrrolidone, N-vinyl piperidone, N-acrylylpyrrolidone, N-acrylylpiperidine, N-acrylylmorpholine, quaternary ammonium salts of ethylenically unsaturated compounds, and mixtures thereof;
      b. the linear polymeric sidechains of the graft copolymer consist essentially of a polymerized hydrophobic macromolecular monomer, said hydrophobic macromolecular monomer comprising a linear polymer or copolymer having a molecular weight of at least about 2,000 and having a substantially uniform molecular weight distribution, such that its ratio of $\overline{M}w/\overline{M}n$ is not substantially above about 1.1, said macromolecular monomer being further characterized as having no more than one copolymerizable moiety per linear polymer or copolymer chain, said copolymerization occurring between the copolymerizable end group of said hydrophobic macromolecular monomer and said copolymerizable hydrophilic comonomer; and
      c. the linear polymeric sidechains of the graft copolymer which are copolymerized into the copolymeric backbone are separated by at least about 20 uninterrupted recurring monomeric units of said hydrophilic polymeric backbone, the distribution of the sidechains along the backbone and the copolymerization being controlled by the reactivity ratio of the copolymerizable end groups on said hydrophobic macromolecular monomer and said copolymerizable hydrophilic comonomer.

2. The graft copolymer according to claim 1, wherein the copolymerizable comonomers are selected from the group consisting of vinyl pyridine quaternary ammonium salts and dimethylaminoethyl methacrylate quaternary salts.

3. The graft copolymer of claim 1, wherein the backbone comonomer is selected from the group consisting of 2-hydroxyethyl acrylate and 2-hydroxyethyl methacrylate.

4. The graft copolymer of claim 1, wherein said hydrophilic copolymerizable comonomer is copolymerized in admixture with a hydrophobic copolymerizable comonomer.

5. The graft copolymer of claim 4, wherein the hydrophobic copolymerizable comonomer is selected from the group consisting of alkyl acrylates and methacrylates, vinyl esters of monocarboxylic acids, vinyl aromatic compounds including styrene and alpha-methylstyrene, vinyl chloride, vinylidene chloride, acrylonitrile, methacrylonitrile, vinylidene cyanide and maleic anhydride.

6. A chemically joined, phase separated selfcured hydrophilic thermoplastic graft copolymer of:
   1. at least one copolymerizable normally hydrophobic macromolecular monomer having a substantially uniform molecular weight distribution, and
   2. at least one copolymerizable comonomer which is rendered hydrophilic forming the polymeric backbone of said copolymer, said copolymerizable normally hydrophobic macromolecular monomer forming linear polymeric sidechains of said graft copolymer, wherein:
      a. the polymeric backbones of the graft copolymer are comprised of polymerized units of said copolymerizable comonomers, wherein the copolymerizable comonomers are selected from the group consisting of vinyl esters of monocarboxylic acids which are rendered hydrophilic by hydrolysis of said vinyl esters subsequent to copolymerization, and mixtures thereof;
      b. the linear polymeric sidechains of the graft copolymer consist essentially of a polymerized hydrophobic macromolecular monomer, said hydrophobic macromolecular monomer comprising a linear polymer or copolymer having a molecular weight of at least about 2,000 and having a substantially uniform molecular weight distribution, such that its ratio of $\overline{M}w/\overline{M}n$ is not substantially above about 1.1, said macromolecular monomer being further characterized as having no more than one copolymerizable moiety per linear polymer or copolymer chain, said copolymerization occurring between the copolymerizable end group of said hydrophobic macromolecular monomer and said copolymerizable hydrophilic comonomer; and
      c. the linear polymeric sidechains of the graft copolymer which are copolymerized into the copolymeric backbone are separated by at least about 20 uninterrupted recurring monomeric units of said hydrophilic polymeric backbone, the distribution of the sidechains along the backbone and the copolymerization being controlled by the reactivity ratios of the copolymerizable end group on said hydrophobic macromolecular monomer and said copolymerizable hydrophilic comonomer.

7. The graft copolymer of claim 6, wherein said vinyl ester is vinyl acetate.

8. A process for preparing a chemically joined, phase separated self-cured hydrophilic thermoplastic graft copolymer comprising:
   1. copolymerizing:
      a. at least one copolymerizable normally hydrophobic macromolecular monomer comprising a linear polymer or copolymer having a molecular weight of at least about 2,000 and having a substantially uniform molecular weight distribution, such that its ratio of $\overline{M}w/\overline{M}n$ is not substantially above about 1.1, said macromolecular monomer being further characterized as having no more than one copolymerizable moiety per linear polymer or copolymer chain, said copolymerizable moiety being on the end of the chain; and b. at least one copolymerizable comonomer, said copolymerizable comonomer forming the polymeric backbones of said graft copolymer and said copolymerizable normally hydrophobic macromolecular monomer forming the linear polymeric sidechains of said graft copolymer, and the linear polymeric sidechains of the graft copolymer are copolymerized into the backbone polymer through the polymerizable end group on said macromolecular monomer, and wherein said copolymerizable comonomer units of the backbone are comprised of a polymerized vinyl ester of a monocarboxylic acid, the linear polymeric sidechains of the graft copolymer which are copolymerized into the copolymeric backbone being separated by at least about 20 uninterrupted recurring monomeric units of said backbone polymer; the copolymerization and distribution of the sidechains along the backbone polymers being controlled by the relative reactivity ratios of the copolymerizable end group on said hydrophobic macromolecular monomer and said copolymerizable comonomer; and 2. saponifying the resulting copolymer to thereby obtain said chemically joined, phase separated self-cured hydrophilic thermoplastic graft copolymer.

9. The process of claim 8, wherein said vinyl ester of a monocarboxylic acid is vinyl acetate.

10. The process of claim 9, wherein the polyvinyl alcohol copolymeric backbone produced is reacted with an epoxyterminated cationic reagent.

11. The process of claim 10, wherein the cationic agent is 2,3-epoxypropyl-trimethyl ammonium chloride.

12. A wet-end additive comprising a chemically joined, phase separated self-cured hydrophilic thermoplastic graft copolymer composed of a polymeric backbone and linear polystyrene sidechains, said graft copolymer having the structural formula:

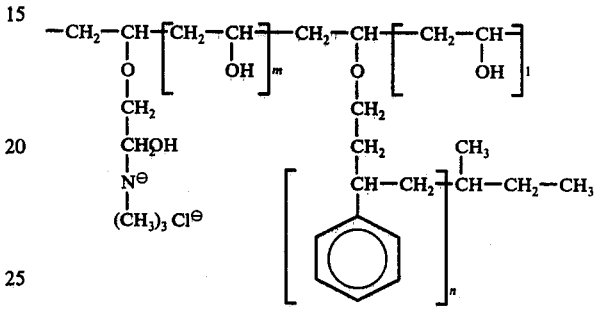

wherein l and n are at least about 20 and m is a positive integer; and wherein the polystyrene sidechains have a substantially uniform molecular weight distribution such that its ratio of Mw/Mn is not substantially above about 1.1.

* * * * *

UNITED STATES PATENT OFFICE
CERTIFICATE OF CORRECTION

Patent No. 4,085,168            Dated April 18, 1978

Inventor(s) Ralph Milkovich etal.

It is certified that error appears in the above-identified patent and that said Letters Patent are hereby corrected as shown below:

The term of this patent subsequent to January 15, 1991 has been disclaimed.

*Signed and Sealed this*

*Fourth* Day of *July 1978*

[SEAL]

Attest:

RUTH C. MASON
*Attesting Officer*

DONALD W. BANNER
*Commissioner of Patents and Trademarks*